United States Patent
Takemoto

(10) Patent No.: US 9,042,029 B2
(45) Date of Patent: May 26, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Shoichi Takemoto, Saitama (JP)

(73) Assignee: CANON KABUSHIKI KAISHA (JP)

( * ) Notice: Subject to any disclaimer, the term of this patent is extended or adjusted under 35 U.S.C. 154(b) by 57 days.

(21) Appl. No.: 14/051,908

(22) Filed: Oct. 11, 2013

(65) Prior Publication Data

US 2014/0118607 A1    May 1, 2014

(30) Foreign Application Priority Data

Oct. 26, 2012   (JP) .................................. 2012-236641

(51) Int. Cl.
   *G02B 15/14*   (2006.01)
   *G02B 15/177*   (2006.01)
   *H04N 5/232*   (2006.01)

(52) U.S. Cl.
   CPC ............ *G02B 15/14* (2013.01); *H04N 5/23296* (2013.01); *G02B 15/177* (2013.01)

(58) Field of Classification Search
   CPC ...... G02B 13/009; G02B 15/14; G02B 15/16; G02B 15/163; G02B 15/167; G02B 15/12
   USPC .................................. 359/676, 680–682, 684
   See application file for complete search history.

(56) References Cited

U.S. PATENT DOCUMENTS

| 7,085,069 B2 | 8/2006 | Toyama | |
| 2013/0113980 A1* | 5/2013 | Nakamura et al. | 348/345 |
| 2013/0215518 A1* | 8/2013 | Mitsuhashi | 359/683 |

FOREIGN PATENT DOCUMENTS

| JP | 02-154216 A | 6/1990 |
| JP | 09-015495 A | 1/1997 |
| JP | 2005-227494 A | 8/2005 |

* cited by examiner

*Primary Examiner* — Darryl J Collins
(74) *Attorney, Agent, or Firm* — Rossi, Kimms & McDowell LLP

(57) ABSTRACT

A zoom lens includes, in order from an object side, a first unit that does not move, a negative second unit which moves during zooming, a positive third unit which moves during zooming, a positive fourth unit which moves during zooming and focus adjustment, an aperture stop that does not move in an optical axis direction, and a positive fifth unit which does not move, wherein $Z_{inf}$ representing a zooming ratio of the entire zoom lens when focused on infinity, $\beta3_{winf}$ and $\beta3_{tinf}$ representing lateral magnifications of the third unit at the wide angle end and a telephoto end, respectively, when focused on infinity, $\beta4_{tinf}$ and $\beta5_{tinf}$ representing lateral magnifications of the fourth unit and the fifth unit, respectively, at the telephoto end when focused on infinity, and f3 and f4 representing focal lengths of the third unit and the fourth unit, respectively, satisfy predetermined conditional expressions.

7 Claims, 12 Drawing Sheets

FIG. 13A
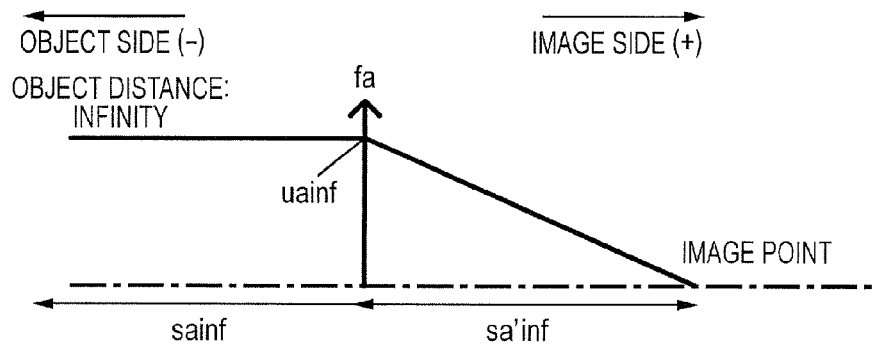
FIG. 13B
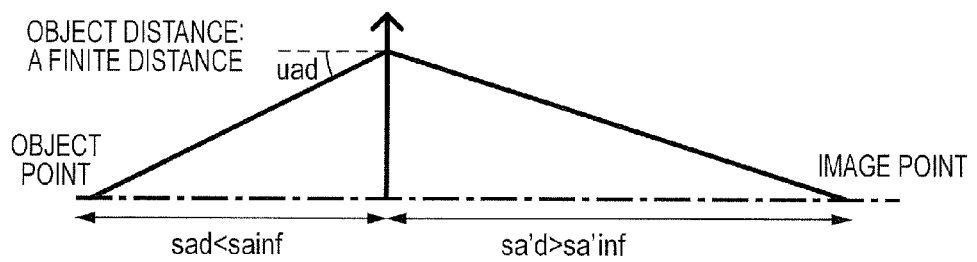
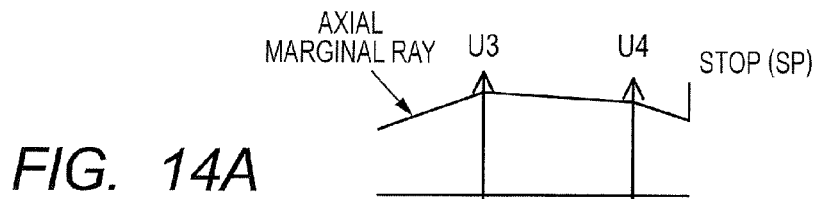
FIG. 14A
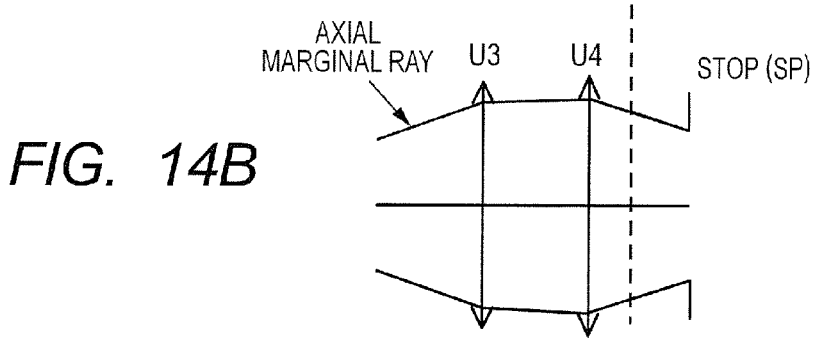
FIG. 14B

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for a broadcasting television camera, a video camera, a digital still camera, and a silver-halide film camera, for example.

2. Description of the Related Art

As to a conventional so-called four-unit zoom lens for a television camera, there are proposed various structures for achieving wide angle, high magnification, and high performance. For instance, Japanese Patent Application Laid-Open No. 2005-227494 proposes an inner-focus-type zoom lens in which a first lens unit is divided into a negative lens unit G11, a first positive lens unit G12, and a second positive lens unit G13 in order from an object side, and the first positive lens unit G12 is moved on an optical axis for performing focusing.

In addition, in recent years, as to a so-called rear-focus-type zoom lens in which a lens unit other than the first lens unit is used for performing focusing, there is proposed a zoom lens in which a change of a zooming ratio due to a focus distance when focusing is performed by a zoom lens unit is noted (see Japanese Patent Application Laid-Open No. H09-015495 and Japanese Patent Application Laid-Open No. H02-154216).

Japanese Patent Application Laid-Open No. H09-015495 proposes a rear focus type having a structure in which, in a five-unit zoom lens, second to fourth lens units are zoom lens units, the fourth lens unit also works for correction of a change of an imaging position due to focusing, and a movement amount of the second lens unit is changed in accordance with a focusing distance.

Japanese Patent Application Laid-Open No. H02-154216 proposes a rear focus type having a structure in which, in a four-unit zoom lens, a zooming portion is used for focusing, and each zoom lens unit is moved in accordance with focusing so that a zooming ratio is not decreased depending on an object distance.

A zoom lens of Japanese Patent Application Laid-Open No. 2005-227494 is an inner focus type using a first unit having a large lens diameter, so that it is difficult to achieve smaller size and lighter weight of the lens because the number of lenses constituting a focus lens unit is large.

As to the zoom lens of Japanese Patent Application Laid-Open No. H09-015495, in order to achieve a high zooming ratio so as to perform focusing by the zoom lens unit, there is a problem in that it is difficult to achieve smaller size and lighter weight of the lens because it is necessary to secure a large stroke of a second unit.

As to the zoom lens of the Japanese Patent Application Laid-Open No. H02-154216, it is necessary to use multiple lens units required to move for focusing, and it is necessary to secure a drive mechanism and a drive space. Therefore, it is difficult to achieve higher magnification and to achieve smaller size and lighter weight of the lens at the same time.

In the five-unit zoom lens as the present invention in which the second to fourth units are the zooming portion, and the fourth unit also works as the focus lens unit, in order to achieve both higher zooming ratio and suppression of decrease of the zooming ratio in short distance imaging, it is important to appropriately set zoom sharing ratios of the second unit and the third unit with respect to the zooming ratio of the entire lens.

Other than that, it is important for downsizing of the focus lens unit and reduction of a movement amount for focusing to appropriately set a relationship between a focal length of the third unit and a focal length of the fourth unit, and to appropriately set a relationship among lateral magnifications of lens units of the fourth unit and thereafter.

SUMMARY OF THE INVENTION

The present invention provides a zoom lens and an image pickup apparatus including the zoom lens, in which a zoom sharing ratio of a zoom lens unit and a refractive power arrangement and lateral magnifications of respective lens units are appropriately defined so as to achieve smaller size and lighter weight as well as higher zooming ratio and to suppress a decrease of the zooming ratio in short distance imaging.

According to one embodiment of the present invention, there is provided a zoom lens including, in order from an object side: a first lens unit that does not move; a second lens unit having a negative refractive power, which moves during zooming; a third lens unit having a positive refractive power, which moves during zooming; a fourth lens unit having a positive refractive power, which moves during zooming and focus adjustment; an aperture stop that does not move in an optical axis direction; and a fifth lens unit having a positive refractive power, which does not move. The following expressions are satisfied:

$$0.10 < LN(\beta 3_{tinf}/\beta 3_{winf})/LN(Z_{inf}) < 0.95;$$

$$0.6 < (1-\beta 4_{tinf}^2) \times \beta 5_{tinf}^2 < 2.5; \text{ and}$$

$$0.6 < f3/f4 < 2.0,$$

where $Z_{inf}$ represents a zooming ratio of an entire system (a zooming ratio of the zoom lens) when focused on infinity, $\beta 3_{winf}$ represents a lateral magnification of the third lens unit at the wide angle end when focused on infinity, $\beta 3_{tinf}$ represents a lateral magnification of the third lens unit at a telephoto end when focused on infinity, $\beta 4_{tinf}$ represents a lateral magnification of the fourth lens unit at the telephoto end when focused on infinity, $\beta 5_{tinf}$ represents a lateral magnification of the fifth lens unit at the telephoto end when focused on infinity, f3 represents a focal length of the third lens unit, and f4 represents a focal length of the fourth lens unit.

According to one embodiment of the present invention, it is possible to provide the zoom lens and the image pickup apparatus including the zoom lens, in which the zoom sharing ratio of the zoom lens unit and the refractive power arrangement and lateral magnifications of respective lens units are appropriately defined so as to achieve smaller size and lighter weight as well as higher zooming ratio and to suppress a decrease of the zooming ratio in short distance imaging.

Further features of the present invention will become apparent from the following description of exemplary embodiments with reference to the attached drawings.

BRIEF DESCRIPTION OF THE DRAWINGS

FIG. 13A is a paraxial arrangement diagram illustrating a relationship between a light beam entering the lens unit and an object image point.

FIG. 13B is a paraxial arrangement diagram illustrating a relationship between the light beam entering the lens unit and the object image point.

FIG. 14A is a paraxial arrangement diagram illustrating a relationship between a light beam entering a fourth lens unit and a stop position.

FIG. 14B is a paraxial arrangement diagram illustrating a relationship between the light beam entering the fourth lens unit and the stop position.

DESCRIPTION OF THE EMBODIMENTS

Embodiments of the present invention are described in detail below with reference to the accompanying drawings.

A zoom lens according to the present invention includes, in order from an object side to an image side, a first lens unit having a positive refractive power, which does not move, a second lens unit having a negative refractive power, which moves during zooming, a third lens unit having a positive refractive power, which moves during zooming, a fourth lens unit having a positive refractive power, which moves during zooming and focus adjustment, and a fifth lens unit having a positive refractive power, which does not move.

Figure 1:
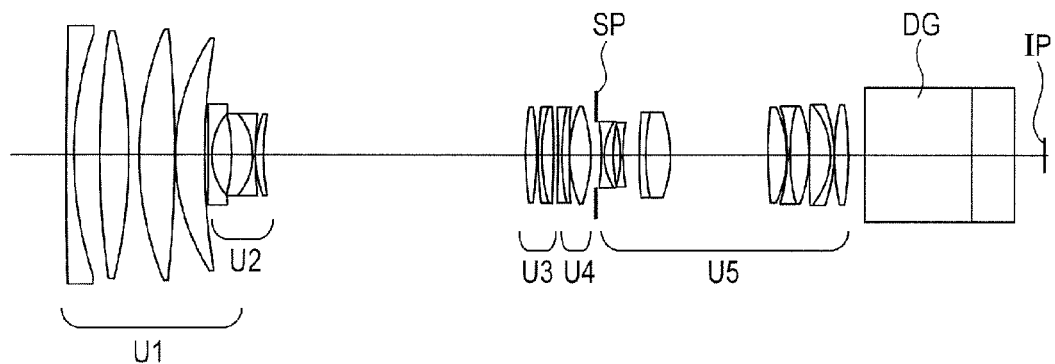
FIG. 1 is a lens cross-sectional view of a zoom lens at a wide angle end when focused on infinity according to Embodiment 1.
Figure 2A:
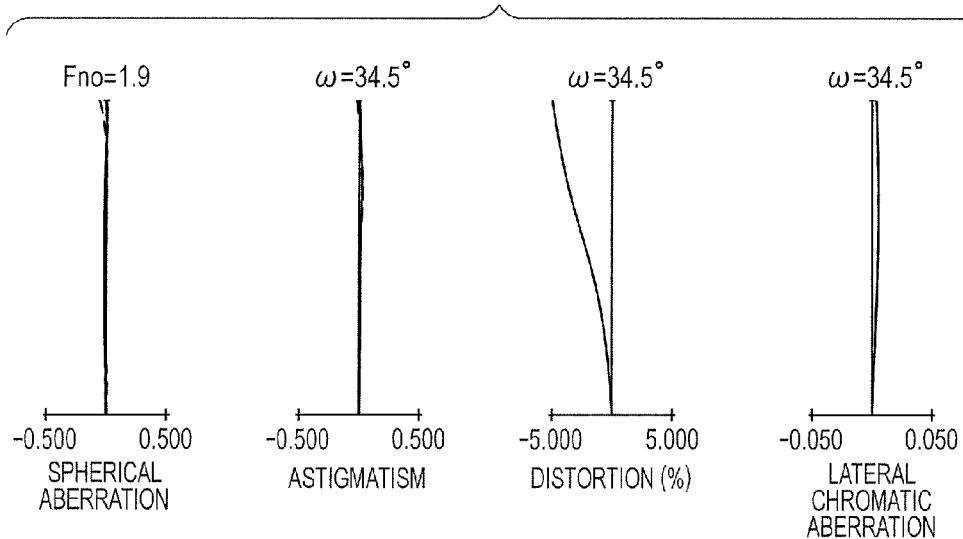
FIG. 2A is an aberration diagram of the zoom lens at the wide angle end when focused on infinity according to Embodiment 1.
Figure 2B:
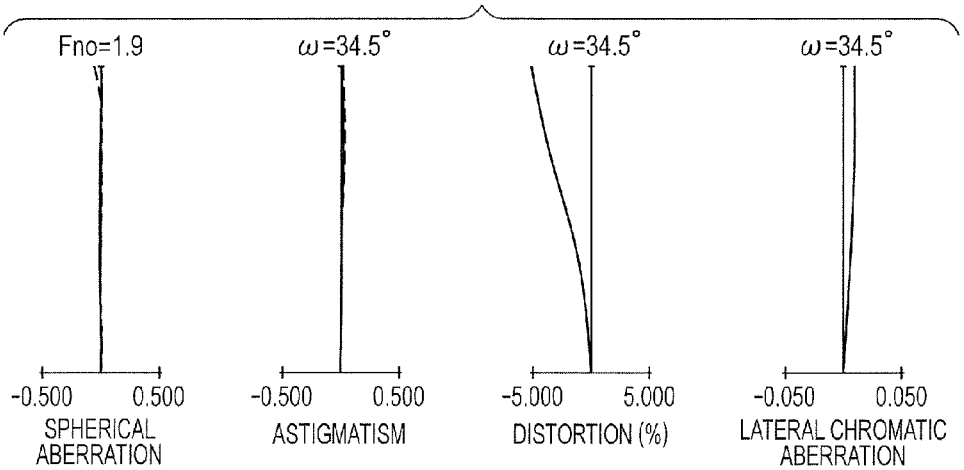
FIG. 2B is an aberration diagram of the zoom lens at the wide angle end when focused on proximity (800 mm from a first plane) according to Embodiment 1.
Figure 2C:
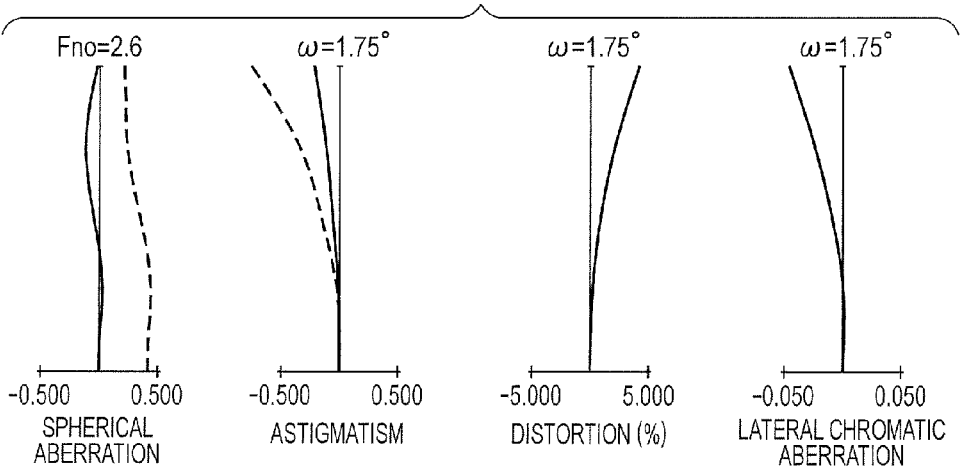
FIG. 2C is an aberration diagram of the zoom lens at a telephoto end when focused on infinity according to Embodiment 1.
Figure 2D:
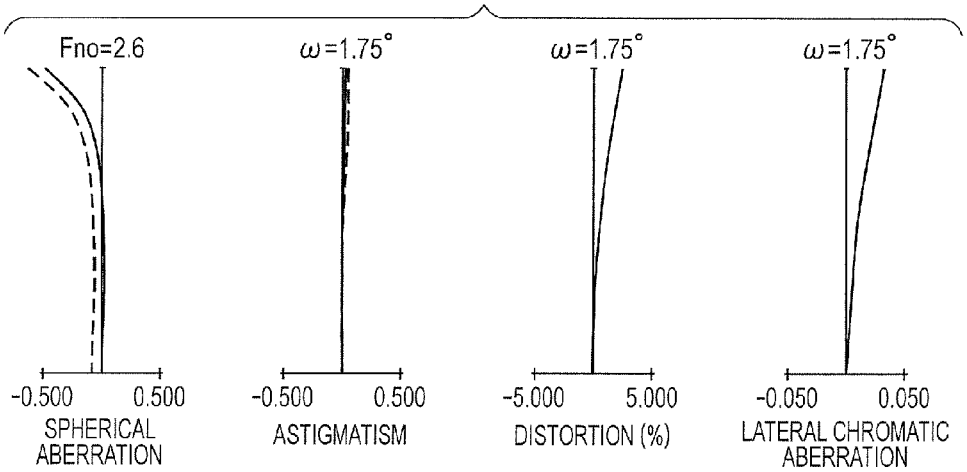
FIG. 2D is an aberration diagram of the zoom lens at the telephoto end when focused on proximity (800 mm from the first plane) (D) according to Embodiment 1.
Figure 3:
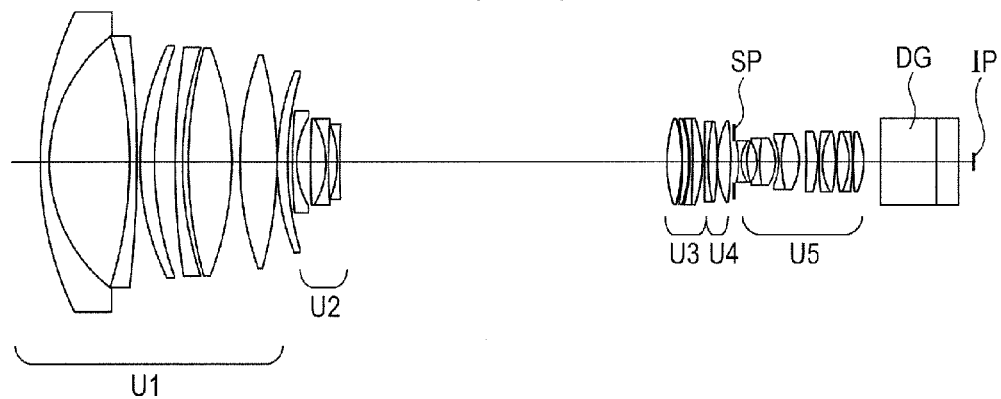
FIG. 3 is a lens cross-sectional view of a zoom lens at a wide angle end when focused on infinity according to Embodiment 2.
Figure 4A:
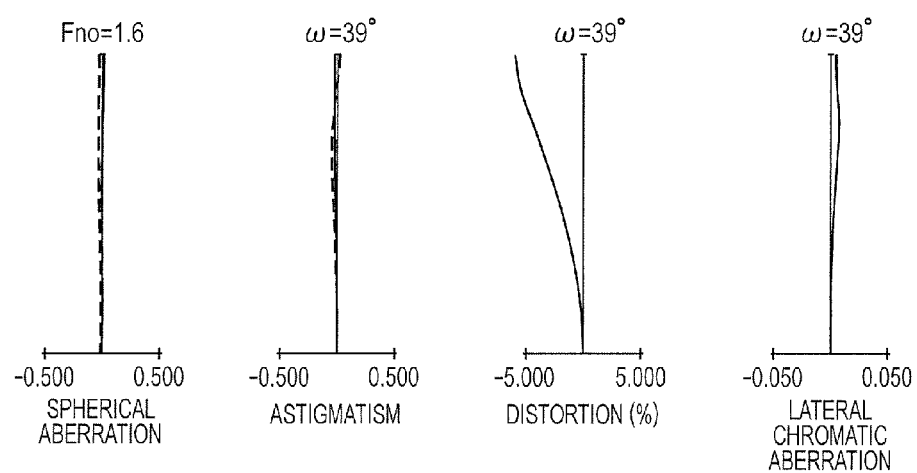
FIG. 4A is an aberration diagram of the zoom lens at the wide angle end when focused on infinity according to Embodiment 2.
Figure 4B:
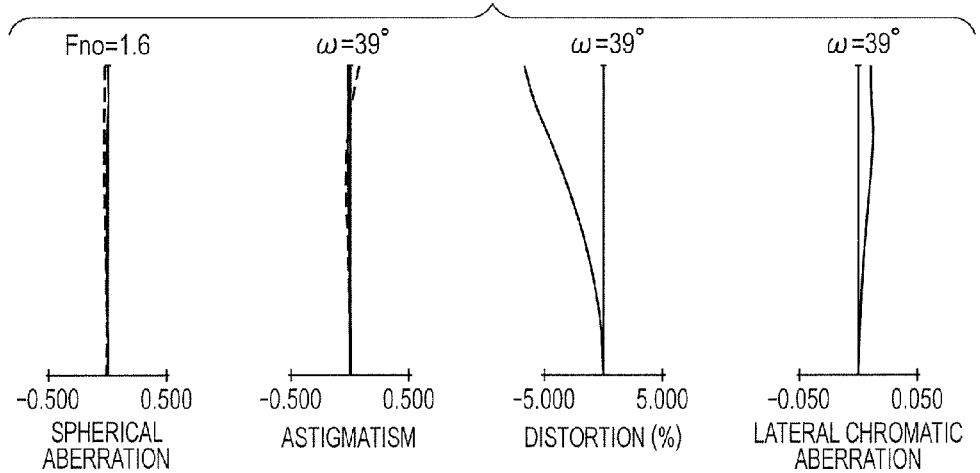
FIG. 4B is an aberration diagram of the zoom lens at the wide angle end when focused on proximity (600 mm from a first plane) according to Embodiment 2.
Figure 4C:
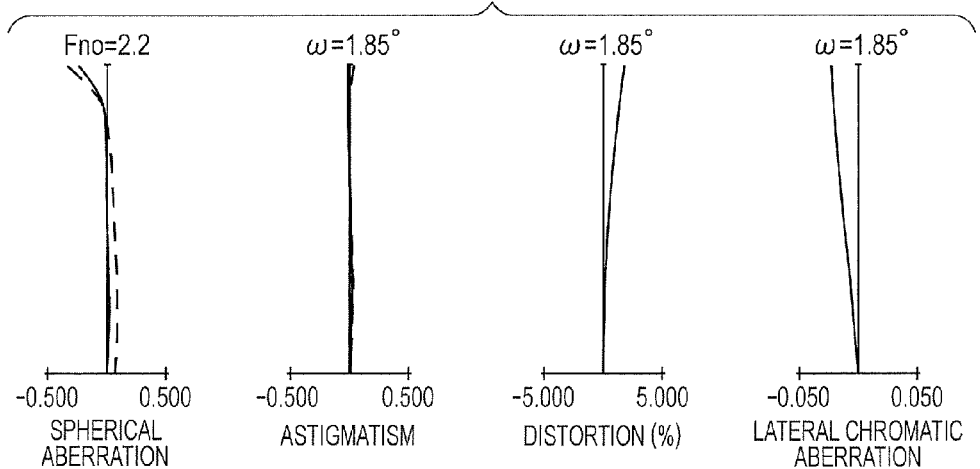
FIG. 4C is an aberration diagram of the zoom lens at a telephoto end when focused on infinity according to Embodiment 2.
Figure 4D:
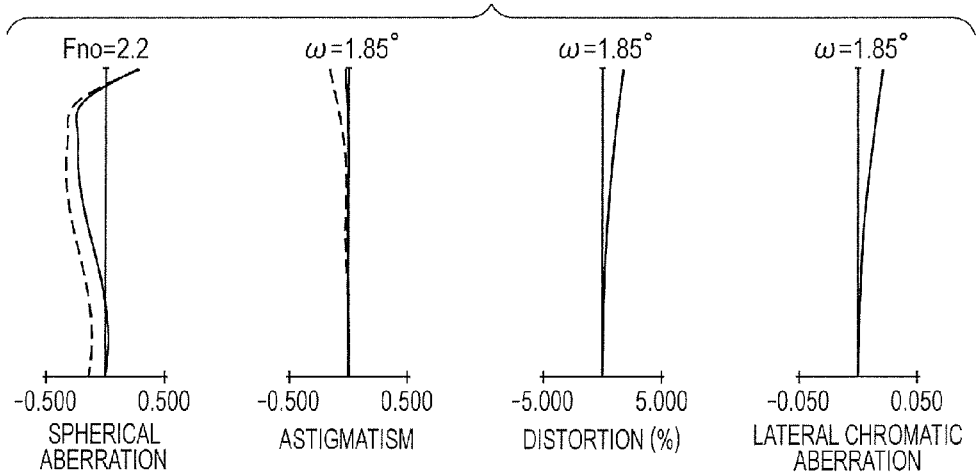
FIG. 4D is an aberration diagram of the zoom lens at the telephoto end when focused on proximity (600 mm from the first plane) according to Embodiment 2.
Figure 5:
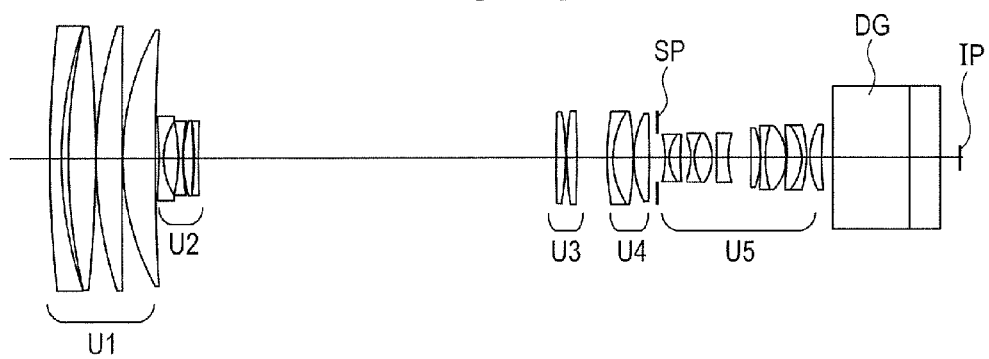
FIG. 5 is a lens cross-sectional view of a zoom lens at a wide angle end when focused on infinity according to Embodiment 3.
Figure 6A:
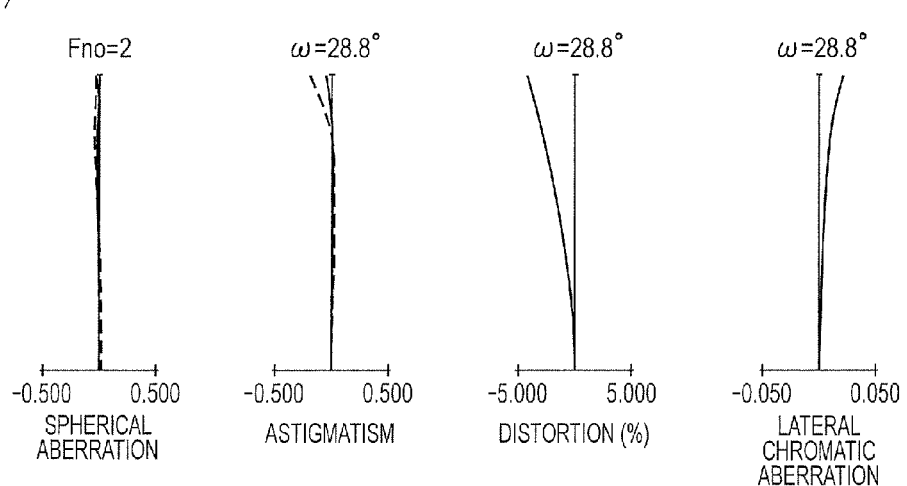
FIG. 6A is an aberration diagram of the zoom lens at the wide angle end when focused on infinity according to Embodiment 3.
Figure 6B:
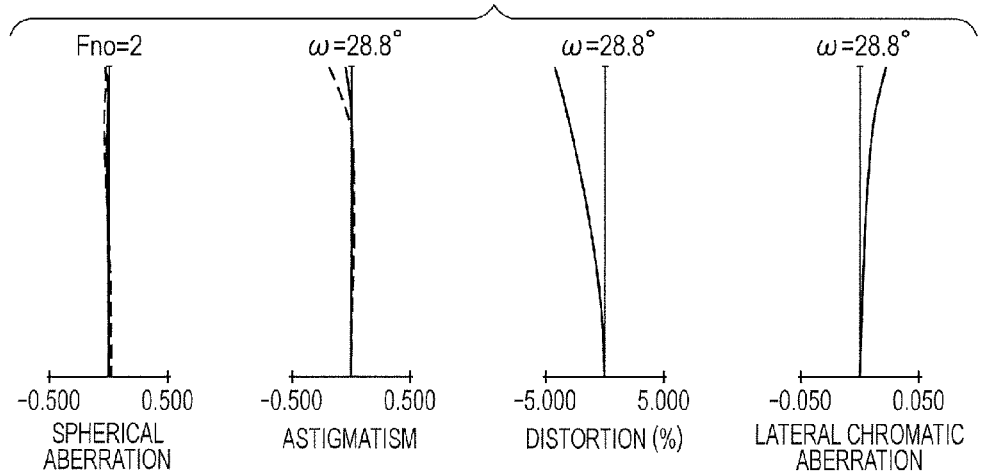
FIG. 6B is an aberration diagram of the zoom lens at the wide angle end when focused on proximity (3,000 mm from a first plane) according to Embodiment 3.
Figure 6C:
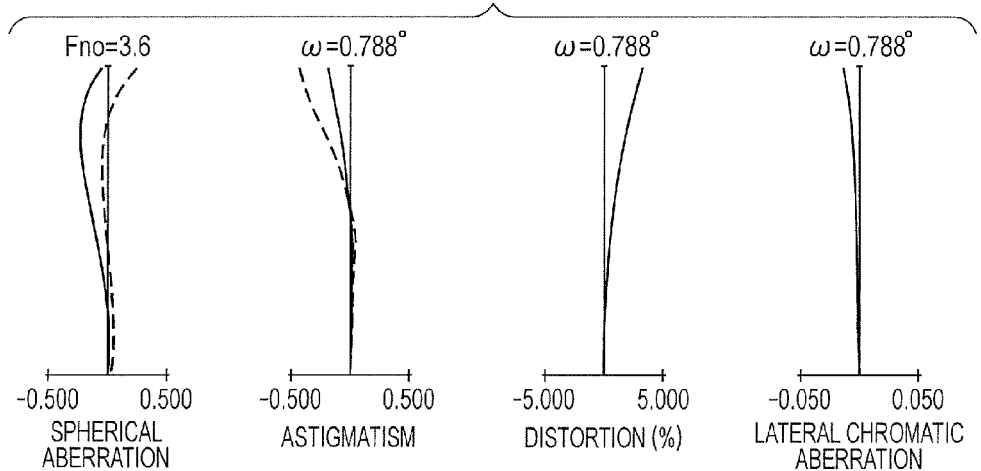
FIG. 6C is an aberration diagram of the zoom lens at a telephoto end when focused on infinity according to Embodiment 3.
Figure 6D:
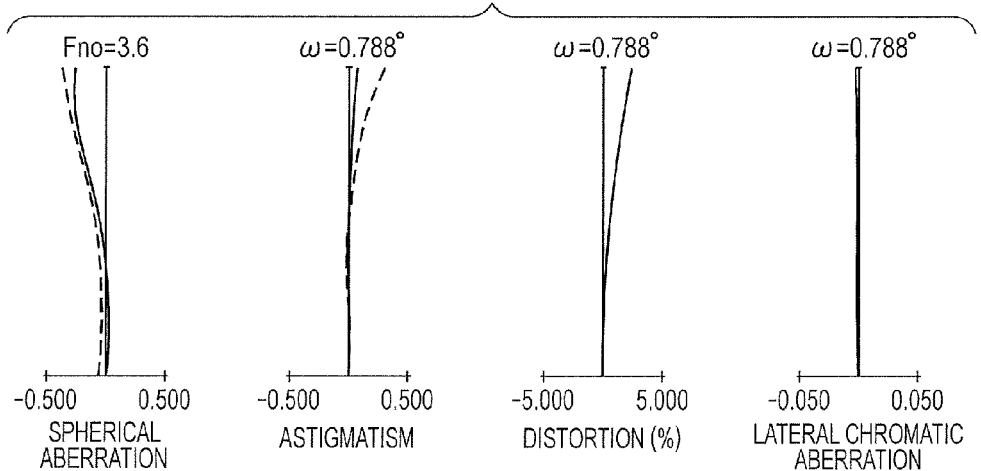
FIG. 6D is an aberration diagram of the zoom lens at the telephoto end when focused on proximity (3,000 mm from the first plane) according to Embodiment 3.
Figure 7:
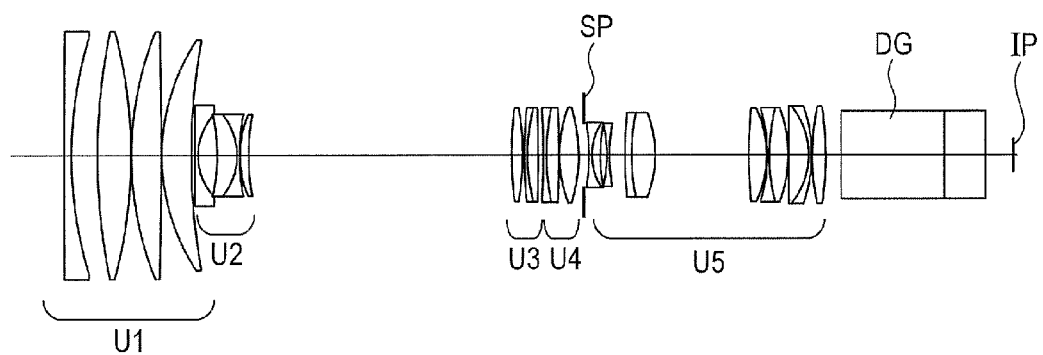
FIG. 7 is a lens cross-sectional view of a zoom lens at a wide angle end when focused on infinity according to Embodiment 4.
Figure 8A:
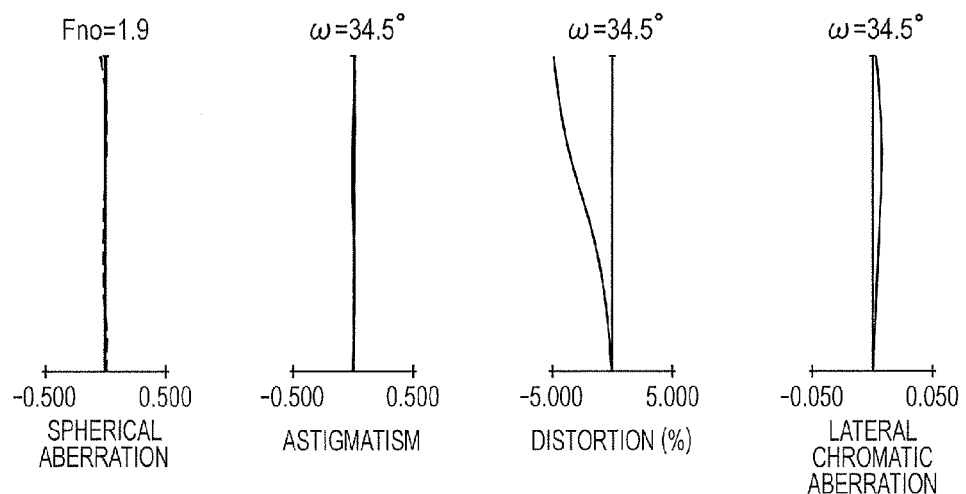
FIG. 8A is an aberration diagram of the zoom lens at the wide angle end when focused on infinity according to Embodiment 4.
Figure 8B:
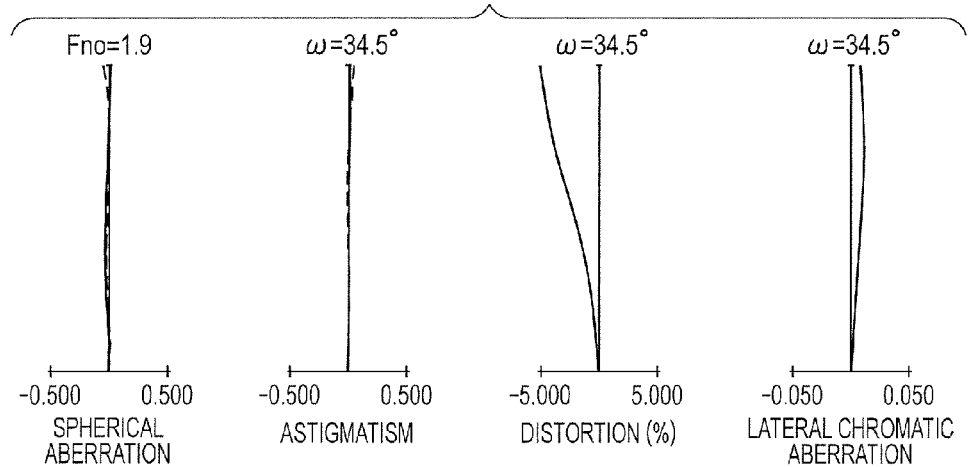
FIG. 8B is an aberration diagram of the zoom lens at the wide angle end when focused on proximity (800 mm from a first plane) according to Embodiment 4.
Figure 8C:
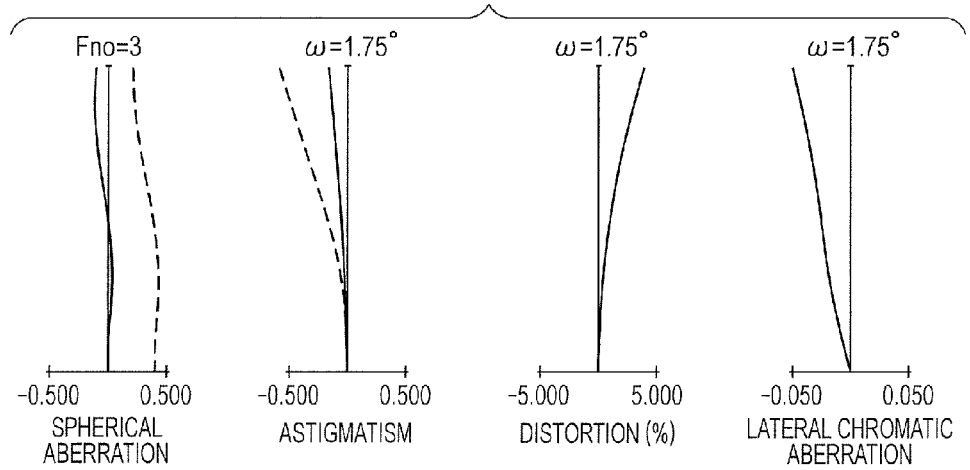
FIG. 8C is an aberration diagram of the zoom lens at a telephoto end when focused on infinity according to Embodiment 4.
Figure 8D:
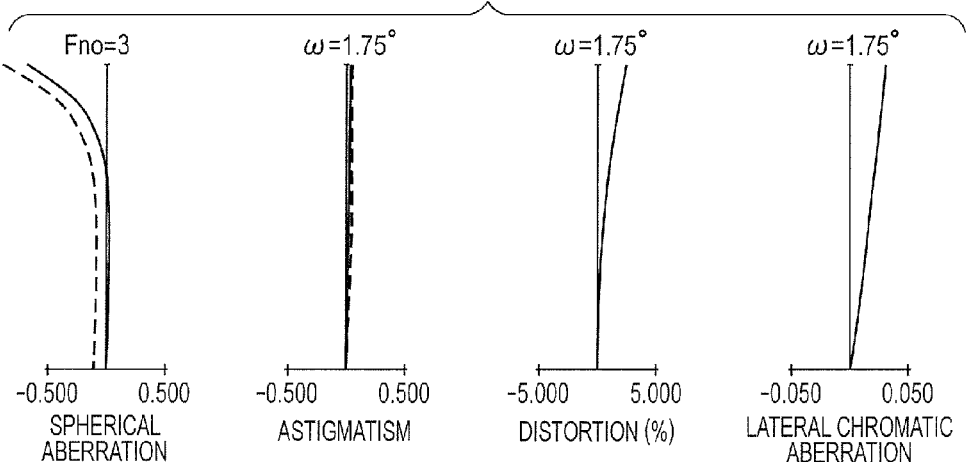
FIG. 8D is an aberration diagram of the zoom lens at the telephoto end when focused on proximity (800 mm from the first plane) according to Embodiment 4.
Figure 9:
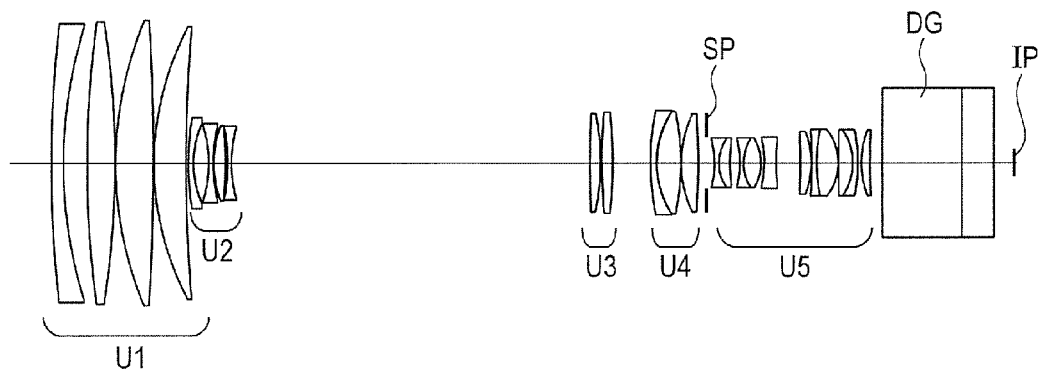
FIG. 9 is a lens cross-sectional view of a zoom lens at a wide angle end when focused on infinity according to Embodiment 5.
Figure 10A:
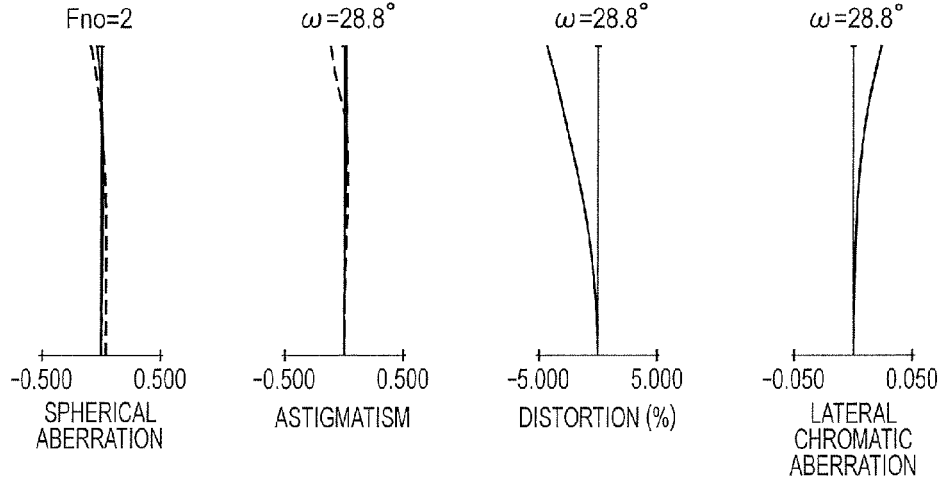
FIG. 10A is an aberration diagram of the zoom lens at the wide angle end when focused on infinity according to Embodiment 5.
Figure 10B:
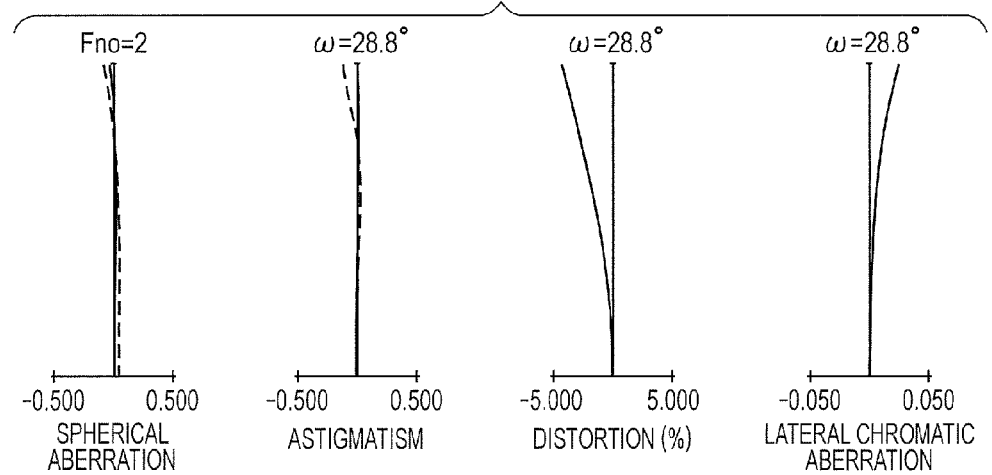
FIG. 10B is an aberration diagram of the zoom lens at the wide angle end when focused on proximity (3,000 mm from a first plane) according to Embodiment 5.
Figure 10C:
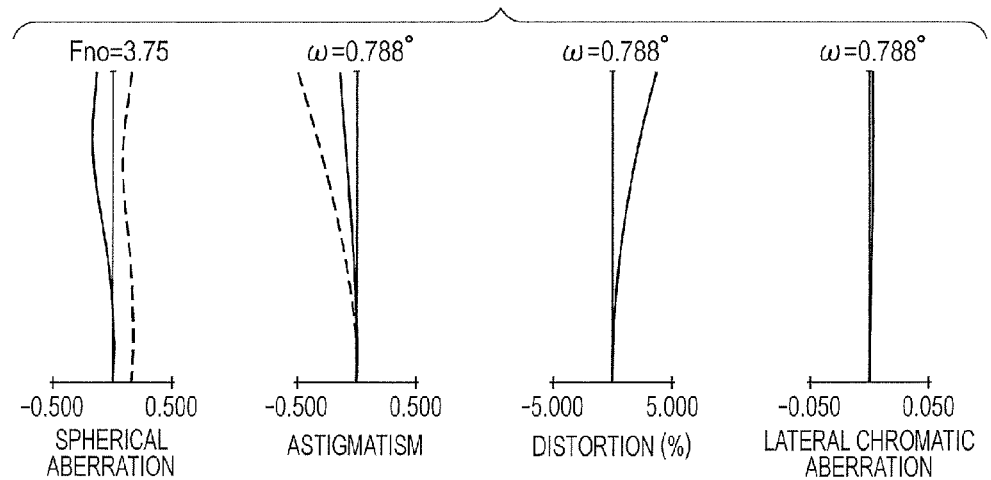
FIG. 10C is an aberration diagram of the zoom lens at a telephoto end when focused on infinity according to Embodiment 5.
Figure 10D:
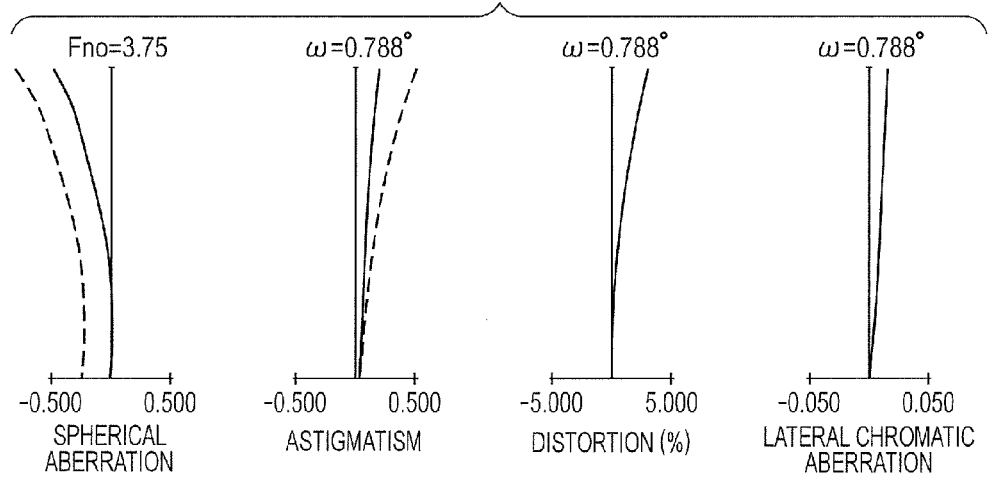
FIG. 10D is an aberration diagram of the zoom lens at the telephoto end when focused on proximity (3,000 mm from the first plane) according to Embodiment 5.

FIG. 1 is a lens cross-sectional view when focused on an object at infinity at a wide angle end (short focal length end) according to Numerical Embodiment 1 as Embodiment 1 of the present invention. FIGS. 2A, 2B, 2C, and 2D are aberration diagrams at the wide angle end when focused on infinity, at the wide angle end when focused on proximity (800 mm from a first plane), at a telephoto end when focused on infinity, and at the telephoto end when focused on proximity (800 mm from the first plane), respectively.

Figure 11:
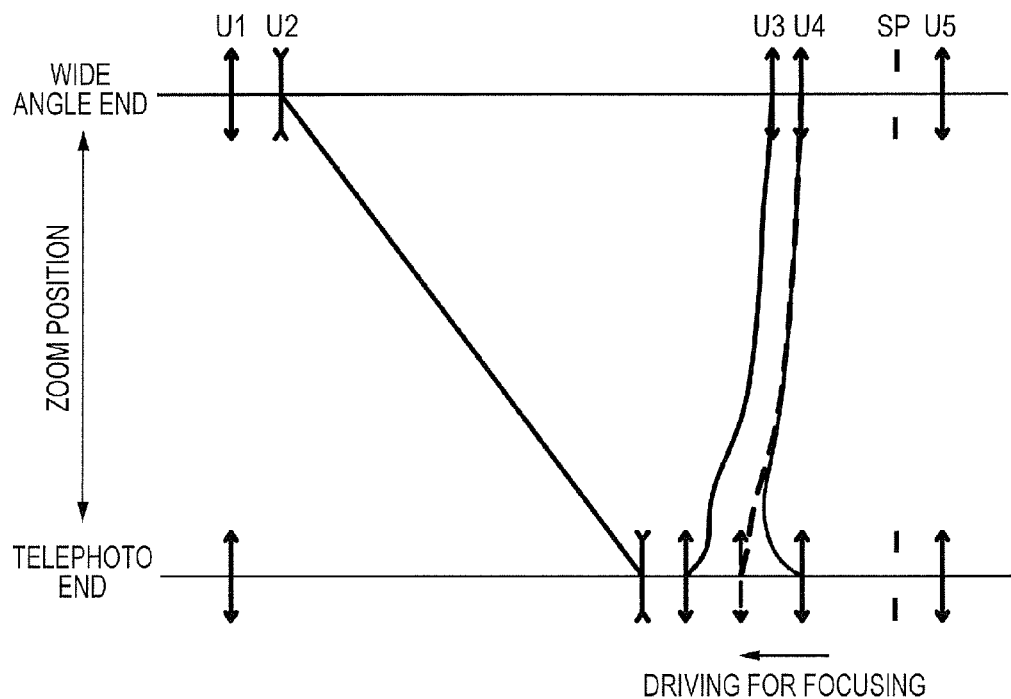
FIG. 11 is a schematic diagram of a moving locus of each lens unit during zooming and focusing according to the present invention.

FIG. 11 is a schematic diagram of a moving locus of each lens unit during zooming and focusing according to the present invention. In the lens cross-sectional views, the left side is a subject (object) side (front side), and the right side is an image side (rear side). A first lens unit U1 having a positive refractive power does not move. A second lens unit U2 having a negative refractive power moves during zooming, and is moved on an optical axis to an image plane side to perform zooming from the wide angle end to the telephoto end. A third lens unit U3 and a fourth lens unit U4 having a positive refractive power both move during zooming, and move on the optical axis from the wide angle end to the telephoto end. Further, the fourth lens unit moves on the optical axis during focusing. Among loci illustrated in FIG. 11, loci illustrated by solid lines are zooming loci of respective lens units in a state focused on infinity, and a locus illustrated by a broken line is a zooming locus of the fourth lens unit in a state focused on proximity. An aperture stop SP does not move in the optical axis direction, and a fifth lens unit (relay lens unit) U5 having a positive refractive power and an imaging action does not move. In the fifth lens unit U5, a converter (extender) for converting a focal length and the like may be mounted. DG represents a color separation prism, an optical filter, and the like, which is illustrated as a glass block in the corresponding figures. An image plane IP corresponds to an image plane of a solid-state image pickup element.

In the aberration diagrams, the straight line and the broken line in the spherical aberration are an e-line and a g-line, respectively. The solid line and the broken line in the astigmatism are for a sagittal image plane (ΔS) and a meridional image plane (ΔM), respectively, and a lateral chromatic aberration is represented by the g-line. The astigmatism and the lateral chromatic aberration indicate amounts of aberrations when a ray passing through a center of a light flux at the stop position is a principal ray. ω is a paraxial half angle of field, and Fno is an F number. Note that, in the following embodiments, the wide angle end and the telephoto end refer to zoom positions where the lens units for zooming are mechanically located at both sides of a movable range on the optical axis.

In the zoom lens of each embodiment, a zoom sharing ratio of the zoom lens unit and a refractive power arrangement and a lateral magnification of each lens unit are appropriately defined. In this manner, there is realized a zoom lens and an image pickup apparatus including the zoom lens, in which smaller size and lighter weight as well as higher zooming ratio are achieved, while a decrease of zooming ratio in short distance imaging is suppressed.

Specifically, the zoom lens includes, in order from the object side, the first lens unit that does not move, the second lens unit having a negative refractive power, which moves during zooming, the third lens unit having a positive refractive power, which moves during zooming, the fourth lens unit having a positive refractive power, which moves during zooming and focusing, and the fifth lens unit having a positive refractive power, which does not move. The aperture stop that does not move is disposed adjacent to the fourth lens unit (or is disposed not excessively apart from the fourth lens unit). The zoom lens satisfies the following conditional expressions:

$$0.10 < LN(\beta 3_{tinf}/\beta 3_{winf})/LN(Z_{inf}) < 0.95;$$

$$0.6 < (1-\beta 4_{tinf}^2) \times \beta 5_{tinf}^2 < 2.5; \text{ and}$$

$$0.6 < f3/f4 < 2.0,$$

where $Z_{inf}$ represents a zooming ratio of the entire zoom lens when focused on infinity, $\beta 3_{winf}$ represents a lateral magnification of the third lens unit when focused on infinity at the wide angle end, $\beta 3_{tinf}$ represents a lateral magnification of the third lens unit when focused on infinity at the telephoto end, $\beta 4_{tinf}$ represents a lateral magnification of the fourth lens unit when focused on infinity at the telephoto end, $\beta 5_{tinf}$ represents a lateral magnification of the fifth lens unit when focused on infinity at the telephoto end, f3 represents a focal length of the third lens unit, and f4 represents a focal length of the fourth lens unit.

FIG. 13A is a paraxial arrangement diagram concerning an axial light beam entering a lens unit a having a positive refractive power and a focal length fa from an object point at infinity. FIG. 13B is a paraxial arrangement diagram concerning an axial light beam entering the lens unit a having a positive refractive power and the focal length fa from an object point at a finite distance.

In the following description, concerning the paraxial arrangement diagram, the direction on the image side is regarded as a positive direction (+) in the optical axis direction. Symbols $ua_{inf}$ and $ua_d$ illustrated in FIGS. 13A and 13B represent beam incident converted inclinations to the lens unit. The converted inclination means a converted angle obtained when being normalized so that a focal, length of the entire lens becomes one, and is normalized in the zoom lens so that a focal length at the wide angle end becomes one.

As illustrated in FIG. 13A, if the object distance is infinity, the incident converted inclination $ua_{inf}$ of the axial light beam is zero. In contrast, as illustrated in FIG. 13B, if the object distance is a finite distance, the incident converted inclination $ua_d$ of the axial light beam becomes negative, and the axial light beam enters as a diverging beam. Therefore, in FIG. 13A and FIG. 13B, the light beams exiting from the lens unit a form images at different points on the optical axis. Here, a relationship between the object image point and the focal length in a thin lens system is expressed by the following imaging expression:

$$1/s' = 1/s + 1/f \quad (11),$$

where s represents an interval between the lens unit and an object point whose light enters the lens unit, s' represents an interval between the lens unit and an image point of the lens unit, and f represents a focal length of the lens unit.

In FIGS. 13A and 13B, $sa_{inf}$ or $sa_d$ corresponds to s, $sa'_{inf}$ or $sa'_d$ corresponds to s', and fa corresponds to f in the expression (11).

If the object is at infinity, $sa_{inf}$ indicated in FIG. 13A becomes infinity. Therefore, $sa'_{inf}$ is determined by the expression (11) as follows.

$$sa'_{inf} = fa \quad (12)$$

Thus, the image is formed at a position distant from the lens unit by the focal length fa.

If the object distance is a finite distance, the object distance $sa_d$ indicated in FIG. 13B has a finite value, and an image is formed at a position farther than the focal length fa on the image side as $sa'_d$ indicated in FIG. 13B, from a relationship of the expression (11). Here, the lateral magnification β of the lens unit is a value obtained by dividing s' by s as follows.

$$\beta = s'/s \quad (13)$$

A relationship between the lateral magnification $\beta_{inf}$ when the object distance is infinity and the lateral magnification $\beta_d$ when the object distance is a finite distance is determined as follows from a relationship among $sa_{inf}$, $sa'_{inf}$, $sa_d$, and $sa'_d$ indicated in FIG. 13A and FIG. 13B.

$$\beta_{inf} \neq \beta_d \quad (17)$$

It is understood that the lateral magnification of the lens unit is changed by a change of the object distance.

Also in a case where multiple lens units are provided, a change of the image point of the lens unit due to the object distance change is taken over as an object point change of a following lens unit, and hence the lateral magnification of the lens unit is changed by the object distance.

When the lateral magnification change is generalized, $\beta a_d$ is expressed by the following expression:

$$\beta a_d = \beta a/(1+\beta a_{inf} \times xa/fa) \quad (10),$$

where xa represents a change amount of the object point distance of the a-th lens unit, $\beta a_{inf}$ represents a lateral magnification when the object distance is infinity, fa represents a focal length of the lens unit, and $\beta a_d$ represents a lateral magnification when the object distance is a finite distance.

As shown by the expression (10), the lateral magnification when the object distance is a finite distance changes depending on the lateral magnification at infinity, the object point change amount, and the focal length. In the case of the zoom lens, the lateral magnification of the lens unit changes depending on a zoom position. Therefore, a change ratio of the lateral magnification due to the object distance is different depending on the zoom position. As a result, there occurs a problem in that an imaging magnification ratio (zoom ratio) between the wide angle end and the telephoto end changes depending on the focus distance.

For the reason described above, when the zooming portion performs focusing, it is important to set paraxial positions of the lens units by considering the lateral magnification change due to the object distance. In particular, in the zoom lens having a high zooming ratio as the present invention, a lateral magnification change itself due to zooming of the second lens unit as a main zoom lens unit is large, and a zooming ratio change due to the object distance becomes conspicuous when the zoom lens unit performs focusing. In the present invention, in addition to the second lens unit as a main zoom lens unit, the third lens unit also shares the zooming appropriately. Thus, a high zooming ratio can be maintained despite of a high zooming ratio even if the object distance is a proximity distance.

Here, the proximity distance means a distance at which the lens can be closest to a subject and is a distance between the subject and a surface of the lens closest to the object side.

In the present invention, the refractive power arrangement of the lens units is appropriately set, and the zoom sharing ratio between the second lens unit and the third lens unit is controlled, so as to suppress the change of the lateral magnification due to the object distance change in the zooming portion. Thus, the zooming ratio of the entire zoom lens system can be maintained to be high. In addition, a focal length ratio between the third lens unit and the fourth lens unit is appropriately defined so as to achieve both the suppression of aberration variation in focusing and suppression of movement amount when the image plane is corrected. In addition, a relationship of lateral magnification among the fourth lens unit and succeeding lens units is appropriately defined so as to suppress a moving amount of the fourth lens unit in focusing.

In each embodiment, a ratio of natural logarithm of a lateral magnification ratio $\beta3_{tinf}/\beta3_{winf}$ between the wide angle end and the telephoto end to natural logarithm of $Z_{inf}$ is defined so that a zoom share of the third lens unit becomes a large ratio with respect to the zooming ratio $Z_{inf}$ of the entire zoom lens when focused on infinity. By satisfying the conditional expression (1), it is possible to suppress an increase of the entire lens length while suppressing a change (decrease) of the zooming ratio due to the object distance change.

$$0.10 < LN(\beta3_{tinf}/\beta3_{winf})/LN(Z_{inf}) < 0.95 \quad (1)$$

If the upper limit condition of the conditional expression (1) is not satisfied, the zoom sharing ratio of the third lens unit becomes too large. The movement amount during zooming increases in inverse proportion to refractive power of the zoom lens unit. Therefore, if the zoom sharing ratio of the third lens unit having weaker refractive power than the second lens unit is too large, a total movement amount of the second to the fourth lens units becomes large during zooming, and hence it becomes difficult to downsize the lens. On the contrary, if the lower limit condition of the conditional expression (1) is not satisfied, the lateral magnification change due to the object distance of the second lens unit on the telephoto side becomes large. Then, the zooming ratio change (decrease) when focused on proximity cannot be suppressed.

It is more preferred that the conditional expression (1) satisfy the range of the following expression (1a).

$$0.33 < LN(\beta3_{tinf}/\beta3_{winf})/LN(Z_{inf}) < 0.95 \quad (1a)$$

The conditional expression (2) defines a relationship between the lateral magnification of the fourth lens unit and the lateral magnification of the fifth lens unit. By satisfying the conditional expression (2), controllability of focus drive can be improved while suppressing a stroke in focusing.

$$0.6 < (1-\beta4_{tinf}^2) \times \beta5_{tinf}^2 < 2.5 \quad (2)$$

If the upper limit condition of the conditional expression (2) is not satisfied, a change of the image plane position when the fourth lens unit is moved becomes too large. Therefore, requirement of position accuracy when the fourth lens unit stops in focusing becomes too high, and hence the control becomes difficult. On the contrary, if the lower limit condition is not satisfied, movement amount of the fourth lens unit necessary for image point correction for the same object point change amount becomes too large, and hence it becomes difficult to downsize the lens.

It is more preferred that the conditional expression (2) satisfy the range of the following expression (2a).

$$1.0 < (1-\beta3_{tinf}^2) \times \beta5_{tinf}^2 < 2.4 \quad (2a)$$

The conditional expression (3) indicates a relationship of a focal length between the third lens unit and the fourth lens unit. By satisfying the conditional expression (3), it is possible to suppress an increase of the entire lens length while suppressing aberration variation due to zooming and focusing.

$$0.5 < f3/f4 < 2.0 \quad (3)$$

If the upper limit condition of the conditional expression (3) is not satisfied, the focal length of the third lens unit becomes relatively large so that a movement amount necessary for the third lens unit to obtain a predetermined zooming ratio during zooming increases. Therefore, it becomes difficult to downsize the lens. On the contrary, if the lower limit condition is not satisfied, a movement amount of the fourth lens unit necessary for correcting the image point change due to the zooming becomes large. Therefore, it becomes difficult to downsize the lens. In addition, the focal length of the third lens unit becomes relatively large so that spherical aberration variation or coma variation in zooming is deteriorated.

It is more preferred that the conditional expression (3) satisfy the range of the following expression (3a).

$$0.75 < f3/f4 < 1.75 \quad (3a)$$

By disposing the fourth lens unit adjacent to the aperture stop that does not move in the optical axis direction (or by disposing the fourth lens unit not excessively apart from the aperture stop), it is possible to suppress an increase of a lens diameter. Because the fourth lens unit functions for both zooming and focusing, it is preferred to reduce the weight of the lens unit as much as possible. By reducing the lens diameter and the weight, high speed focus drive can be realized. In addition, if the fourth lens unit is driven by an electrical mechanism such as an ultrasonic motor, an effect of reducing power necessary for driving can be obtained by reducing work load of driving the fourth lens unit. Because the work load is a product of the movement amount and the weight of the lens unit, the work load is reduced by reducing the weight. FIGS. 14A and 14B illustrate a lens layout of the third lens unit and the fourth lens unit at the telephoto side zoom position at which an effective diameter of the fourth lens unit is determined. When viewing an axial marginal ray from the aperture stop to the object side, the ray enters the fourth lens unit with a diverging angle as illustrated in FIGS. 14A and 14B. In the case where the fifth lens unit is a relay lens unit for performing an imaging action as in the present invention, the angle is constant regardless of the zoom position. Therefore, as the fourth lens unit becomes farther from the aperture stop to the object side, the lens diameter of the fourth lens unit becomes larger. Therefore, it is important for reducing the lens diameter to dispose the fourth lens unit at a position adjacent to the aperture stop (or to disposed not excessively apart from the aperture stop).

The distance between the fourth lens unit and the aperture stop preferably satisfies the following conditional expression, $$0.1 < L4w < 40,$$

where L4w represents the distance between the fourth lens unit and the aperture stop at the wide angle end. And further preferably, the distance L4w satisfies the following conditional expression, $$0.5 < L4w < 20.$$

As described above, by appropriately setting the zoom sharing ratio of the third lens unit, a refractive power ratio between the third lens unit and the fourth lens unit, and the relationship of lateral magnification among the fourth lens unit and the following lens units, it is possible to suppress a decrease of the zooming ratio when focused on proximity by a high magnification zoom lens even in a rear focus type. In each embodiment, it is more preferred to satisfy one or more of the following conditions.

It is preferred that the focal length f1 of the first lens unit and the focal length ft of the entire zoom lens system at the telephoto end satisfy the following expression.

$$0.8 < ft/f1 < 4.0 \quad (4)$$

The conditional expression (4) defines a ratio of the focal length ft at the telephoto end to the focal length f1 of the first lens unit, and hence axial chromatic aberration is appropriately corrected while achieving higher zooming ratio. If the upper limit condition of the conditional expression (4) is not satisfied, an enlargement ratio at the telephoto end of the first lens unit becomes too large. Therefore, it becomes difficult to correct spherical aberration variation and axial chromatic aberration on the telephoto side. If the lower limit condition of the conditional expression (4) is not satisfied, the focal lengths of the second lens unit to the fourth lens unit are liable to be short, and hence it becomes difficult to suppress aberration variation due to zooming.

It is preferred that the focal length f1 of the first lens unit and the focal length f2 of the second lens unit satisfy the following expression.

$$-10.0 < f1/f2 < -4.0 \quad (5)$$

The conditional expression (5) defines a ratio of the focal length f1 of the first lens unit to the focal length f2 of the second lens unit. By satisfying the conditional expression (5), the axial chromatic aberration is appropriately corrected, while the movement amount of the second lens unit during zooming is reduced. Thus, higher magnification of 15 times or higher is achieved, while the entire lens length is shortened. If the upper limit condition of the conditional expression (5) is not satisfied, the focal length of the second lens unit becomes relatively short to be advantageous for downsizing, but the aberration variation due to zooming is increased. If the lower limit condition of the conditional expression (5) is not satisfied, the focal length of the second lens unit becomes relatively long. Therefore, the movement amount of the second lens unit due to zooming is increased so that the entire system becomes large, and hence downsizing and weight reduction become difficult.

It is preferred that the focal length f1 of the first lens unit and the focal length f3 of the third lens unit satisfy the following expression.

$$1.0 < f1/f3 < 3.5 \quad (6)$$

The conditional expression (6) defines a ratio of the focal length of the first lens unit to the focal length of the third lens unit. By satisfying the conditional expression (6), it becomes easy to achieve both aberration correction and small size and light weight.

If the upper limit condition of the conditional expression (6) is not satisfied, the refractive power of the third lens unit becomes too strong relatively to the refractive power of the first lens unit. Therefore, variations of spherical aberration and coma are increased, and hence correction becomes difficult.

If the lower limit condition of the conditional expression (6) is not satisfied, the refractive power of the third lens unit becomes too weak relatively to the refractive power of the first lens unit. Therefore, the movement amount of the third lens unit due to zooming is increased to upsize the entire system, and hence it becomes difficult to achieve smaller size and lighter weight.

It is preferred that the focal length f1 of the first lens unit and the focal length f4 of the fourth lens unit satisfy the following expression.

$$1.0 < f1/f4 < 4.0 \quad (7)$$

The conditional expression (7) defines a ratio of the focal length of the first lens unit to the focal length of the fourth lens unit. By satisfying the conditional expression (7), it becomes easy to achieve both aberration correction and small size and light weight.

If the upper limit condition of the conditional expression (7) is not satisfied, the refractive power of the fourth lens unit becomes too strong relatively to the refractive power of the first lens unit. Therefore, variations of spherical aberration and coma are increased, and hence correction becomes difficult.

If the lower limit condition of the conditional expression (7) is not satisfied, the refractive power of the fourth lens unit becomes too weak relatively to the refractive power of the first lens unit. Therefore, the movement amount of the fourth lens unit due to image point correction is increased to upsize the entire system, and hence it becomes difficult to achieve smaller size and lighter weight.

It is preferred that the focal length f1 of the first lens unit and the focal length f5 of the fifth lens unit satisfy the following expression.

$$2.5 < f1/f5 < 8.0 \quad (8)$$

The conditional expression (8) defines a ratio of the focal length of the first lens unit to the focal length of the fifth lens unit. The fifth lens unit includes a lens unit having a negative refractive power and a lens unit having a positive refractive power. When the entire fifth lens unit has a refractive power to satisfy the conditional expression (8), it becomes easy to secure an interval for inserting an auxiliary lens such as an extender and to obtain sufficient exit pupil and back focus while achieving smaller size.

If the upper limit condition of the conditional expression (8) is not satisfied, a refractive power of a front lens unit having a negative refractive power constituting the fifth lens unit becomes weak. Then, sufficient exit pupil and back focus cannot be secured, or the entire lens system becomes large because a principal point interval between the front lens unit having a negative refractive power and a rear lens unit having a positive refractive power is increased.

If the lower limit condition of the conditional expression (8) is not satisfied, a refractive power of the front lens unit having a negative refractive power constituting the fifth lens unit becomes strong so that the light beam entering the rear lens unit having a positive refractive power becomes a strongly diverging light beam. Therefore, the lens diameter is increased, or a principal point interval between the front lens unit having a negative refractive power and the rear lens unit having a positive refractive power is decreased. Thus the interval for inserting an auxiliary lens such as an extender cannot be secured.

As to the conditional expressions (4) to (8), it is more preferred to satisfy the ranges of the following expressions (4a) to (8a).

$$1.0 < ft/f1 < 3.0 \quad (4a)$$

$$-8.0 < f1/f2 < -4.5 \quad (5a)$$

$$1.2 < f1/f3 < 3.0 \quad (6a)$$

$$1.5 < f1/f4 < 3.5 \quad (7a)$$

$$2.8 < f1/f5 < 6.3 \quad (8a)$$

It is preferred that the zoom lens of the present invention satisfy the following expression:

$$0.7 < Z_{mod}/Z_{inf} \leq 1.5 \quad (9),$$

where $Z_{inf}$ represents a zooming ratio of the entire lens system when the object distance is infinity, and $Z_{mod}$ represents a zooming ratio of the entire lens system when the object distance is proximity.

Embodiment 1

The second lens unit U2, the third lens unit U3, and the fourth lens unit U4, which are moving lens units in Embodiment 1 as Numerical Embodiment 1, are described. The second lens unit U2 corresponds to a ninth lens surface to a fifteenth lens surface in Numerical Embodiment 1, and includes, in order from the object side, a negative lens, a cemented negative lens in which a positive lens and a negative lens are cemented in this order, and a negative lens. The third lens unit U3 corresponds to a sixteenth lens surface to a twentieth lens surface in Numerical Embodiment 1, and includes, in order from the object side, a positive lens, and a cemented lens in which a negative lens and a positive lens are cemented in this order. The fourth lens unit U4 corresponds to a twenty-first lens surface to a twenty-fifth lens surface in Numerical Embodiment 1, and includes, in order from the object side, a cemented lens in which a negative lens and a positive lens are cemented in this order, and a positive lens. Aspherical surfaces are used for the ninth, sixteenth, and twenty-fifth surfaces. The ninth lens surface is used mainly for correcting distortion on the wide angle side, the sixteenth lens surface is used for correcting off-axial aberration such as coma on the wide angle side, and the twenty-fifth lens surface is used for correcting spherical aberration on the telephoto side.

Conditional expression corresponding values of this embodiment are shown in Table 1. This Numerical Embodiment satisfies every conditional expression so as to achieve good optical performance, while achieving wide angle and high magnification such as a focal length of 8 mm at the wide angle end and a zooming ratio of 22.5. Further, despite of a structure of performing focusing a small and lightweight fourth lens unit, a high zooming ratio of 20 is maintained as a ratio of field of view between the wide angle end and the telephoto end, even when focused on a proximity end (at 0.8 m from a vertex of the first lens surface to the object side).

Embodiment 2

The second lens unit U2, the third lens unit U3, and the fourth lens unit U4, which are moving lens units in Embodiment 2 as Numerical Embodiment 2, are described. The second lens unit U2 corresponds to a fifteenth lens surface to a twenty-first lens surface in Numerical Embodiment 2, and includes, in order from the object side, a negative lens, a cemented negative lens in which a positive lens and a negative lens are cemented in this order, and a negative lens. The third lens unit U3 corresponds to a twenty-second lens surface to a twenty-eighth lens surface in Numerical Embodiment 2, and includes, in order from the object side, two positive lenses, and a cemented lens in which a negative lens and a positive lens are cemented in this order. The fourth lens unit U4 corresponds to a twenty-ninth lens surface to a thirty-third lens surface in Numerical Embodiment 2, and includes, in order from the object side, a cemented lens in which a negative lens and a positive lens are cemented in this order, and a positive lens. Aspherical surfaces are used for the fifteenth, twenty-third, and thirty-third surfaces. The fifteenth lens surface is used mainly for correcting distortion on the wide angle side, the twenty-third lens surface is used for correcting off-axial aberration such as coma on the wide angle side, and the thirty-third lens surface is used for correcting spherical aberration on the telephoto side.

Conditional expression corresponding values of this embodiment are shown in Table 1. This Numerical Embodiment satisfies every conditional expression so as to achieve good optical performance, while achieving wide angle and high magnification such as a focal length of 6.8 mm, at the wide angle end and a zooming ratio of 25. Further, despite of a structure of performing focusing a small and lightweight fourth lens unit, a high zooming ratio of 20 is maintained as a ratio of field of view between the wide angle end and the telephoto end, even when focused on a proximity end (at 0.6 m from a vertex of the first lens surface to the object side).

Embodiment 3

The second lens unit U2, the third lens unit U3, and the fourth lens unit U4, which are moving lens units in Embodiment 3 as Numerical Embodiment 3, are described. The second lens unit U2 corresponds to a ninth lens surface to a sixteenth lens surface in Numerical. Embodiment 3, and includes, in order from the object side, two negative lenses, a positive lens, and a negative lens. The third lens unit U3 corresponds to a seventeenth lens surface to a twentieth lens surface in Numerical Embodiment 3, and includes two positive lenses. The fourth lens unit U4 corresponds to a twenty-first lens surface to a twenty-fifth lens surface in Numerical Embodiment 3, and includes, in order from the object side, a cemented lens in which a negative lens and a positive lens are cemented in this order, and a positive lens. An aspherical surface is used for the ninth surface, which is used mainly for correcting, on the wide angle side, distortion and filed curvature.

Conditional expression corresponding values of this embodiment are shown in Table 1. This Numerical Embodiment satisfies every conditional expression so as to achieve good optical performance, while achieving wide angle and high magnification such as a focal length of 10 mm at the wide angle end and a zooming ratio of 40. Further, despite of a structure of performing focusing a small and lightweight fourth lens unit, a high zooming ratio of 30 is maintained as a ratio of field of view between the wide angle end and the telephoto end, even when focused on a proximity end (at 3 m from a vertex of the first lens surface to the object side).

Embodiment 4

The second lens unit U2, the third lens unit U3, and the fourth lens unit U4, which are moving lens units in Embodiment 4 as Numerical Embodiment 4, are described. The second lens unit U2 corresponds to a ninth lens surface to a fifteenth lens surface in Numerical Embodiment 4, and includes, in order from the object side, a negative lens, a cemented negative lens in which a positive lens and a negative lens are cemented in this order, and a negative lens. The third lens unit U3 corresponds to a sixteenth lens surface to a twentieth lens surface in Numerical Embodiment 4, and includes, in order from the object side, a positive lens, and a cemented lens in which a negative lens and a positive lens are cemented in this order. The fourth lens unit U4 corresponds to a twenty-first lens surface to a twenty-fifth lens surface in Numerical Embodiment 4, and includes, in order from the object side, a cemented lens in which a negative lens and a positive lens are cemented in this order, and a positive lens. Aspherical surfaces are used for the ninth, sixteenth, and twenty-fifth surfaces. The ninth lens surface is used mainly for correcting distortion on the wide angle side, the sixteenth lens surface is used for correcting off-axial aberration such as coma on the wide angle side, and the twenty-fifth lens surface is used for correcting spherical aberration on the telephoto side.

Conditional expression corresponding values of this embodiment are shown in Table 1. This Numerical Embodiment satisfies every conditional expression so as to achieve good optical performance, while achieving wide angle and high magnification such as a focal length of 8 mm at the wide angle end and a zooming ratio of 22.5. Further, despite of a structure of performing focusing a small and lightweight fourth lens unit, a high zooming ratio of 20 is maintained as a ratio of field of view between the wide angle end and the telephoto end, even when focused on a proximity end (at 0.8 m from a vertex of the first lens surface to the object side).

Embodiment 5

The second lens unit U2, the third lens unit U3, and the fourth lens unit U4, which are moving lens units in Embodiment 5 as Numerical Embodiment 5, are described. The second lens unit U2 corresponds to a ninth lens surface to a sixteenth lens surface in Numerical Embodiment 5, and includes, in order from the object side, two negative lenses, a positive lens, and a negative lens. The third lens unit U3 corresponds to a seventeenth lens surface to a twentieth lens surface in Numerical Embodiment 5, and includes two positive lenses. The fourth lens unit U4 corresponds to a twenty-first lens surface to a twenty-fifth lens surface in Numerical Embodiment 5, and includes, in order from the object side, a cemented lens in which a negative lens and a positive lens are cemented in this order, and a positive lens. An aspherical surface is used for the ninth surface, which is used mainly for correcting distortion on the wide angle side and field curvature.

Conditional expression corresponding values of this embodiment are shown in Table 1. This Numerical Embodiment satisfies every conditional expression so as to achieve good optical performance, while achieving wide angle and high magnification such as a focal length of 10 mm at the wide angle end and a zooming ratio of 40. Further, despite of a structure of performing focusing a small and lightweight fourth lens unit, a high zooming ratio of 35 is maintained as a ratio of field of view between the wide angle end and the telephoto end, even when focused on a proximity end (at 3 m from a vertex of the first lens surface to the object side).

Figure 12:
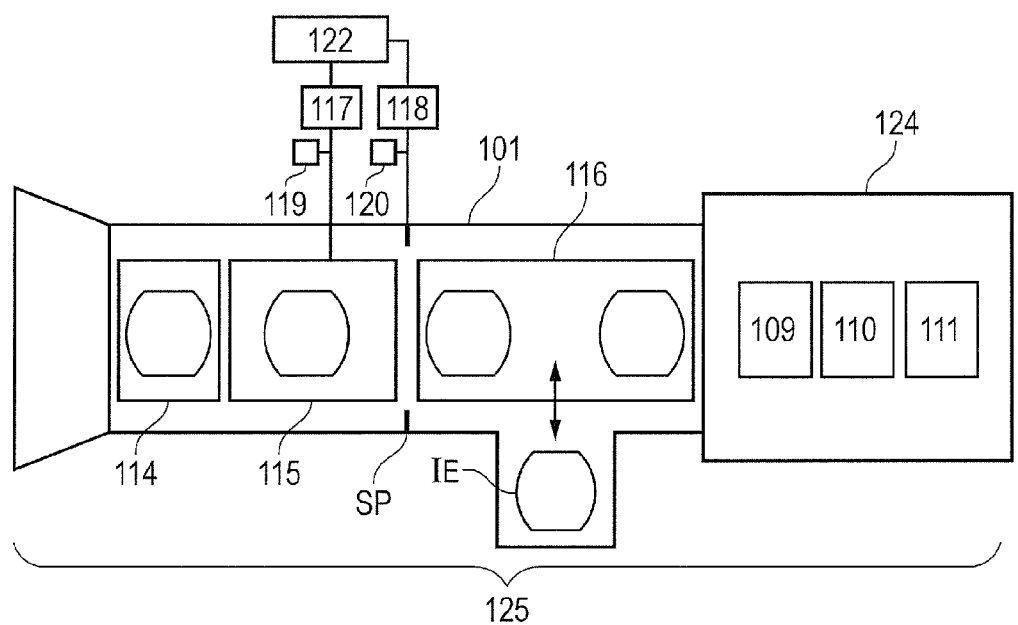
FIG. 12 is a main part schematic diagram of an image pickup apparatus (television camera system) in which the zoom lens of each embodiment is used as an image pickup optical system.

Next, an image pickup apparatus using each zoom lens described above as an image pickup optical system is described. FIG. 12 is a main part schematic diagram of the image pickup apparatus (television camera system) using the zoom lens of each embodiment as the image pickup optical system. In FIG. 12, a zoom lens 101 is one of zoom lenses of Embodiment 1 to Embodiment 5.

The zoom lens 101 is removably mounted to a camera 124. The camera 124 mounted with the zoom lens 101 constitutes an image pickup apparatus 125. The zoom lens 101 includes a first lens unit 114, a zooming portion (also serving as a focusing portion) 115 including second and third lens units that move during zooming and a fourth lens unit that moves on the optical axis during zooming and focusing, and a fifth lens unit 116 for imaging. The aperture stop SP is provided. The fifth lens unit 116 that does not move during zooming and focusing includes a zooming optical system IE that can be inserted in and removed from the optical path.

The zooming portion 115 includes a drive mechanism to be driven in the optical axis direction. Drive units 117 and 118, such as a motor, are configured to electrically drive the zooming portion 115 and the aperture stop SP. Detectors 119 to 120, such as an encoder, a potentiometer, or a photo-sensor, are configured to detect the positions of the lens units in the zooming portion 115 on the optical axis, and the aperture diameter of the aperture stop SP. Further, a driving locus of each lens unit in the zooming portion 115 may be a mechanical locus such as a helicoid or a cam, or may be an electric locus by an ultrasonic motor or the like. The camera 124 includes a glass block 109, which corresponds to an optical filter or a color separation prism provided within the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101. Further, central processing units (CPUs) 111 and 122 control the driving of the camera 124 and the zoom lens 101. By applying the zoom lens according to the present invention to a television camera as described above, an image pickup apparatus having high optical performance may be realized.

The exemplary embodiments of the present invention are described above, but the present invention is not limited to these embodiments and can be modified and changed variously within the scope of the gist thereof.

Next, Numerical Embodiments 1 to 5 corresponding to Embodiments 1 to 5 of the present invention are shown below. In each of the numerical embodiments, "i" represents the order of a surface from the object side, "ri" represents a radius of curvature of an i-th surface from the object side, "di" represents an interval between the i-th surface and the (i+1)th surface from the object side, and "ndi" and "vdi" respectively represent a refractive index and an Abbe number of the i-th optical member. The final three surfaces include a glass block such as a filter. The focal length, the F number, and the angle of field represent values when focused on the object at infinity. BF is an equivalent air value of a distance from the final surface of the glass block to the image plane.

Note that, the aspherical shape is expressed by the following expression:

$$x=(y^2/r)/\{1+(1-k\times y^2/r^2)^{0.5}\}+A2\times y^2+A3\times y^3+A4\times y^4+A5\times y^5+A6\times y^6+A7\times y^7+A8\times y^8+A9\times y^9+A10\times y^{10}+A11\times y^{11}+A12\times y^{12}$$

where x represents a coordinate in the optical axis direction, y represents a coordinate in a direction perpendicular to the optical axis, r represents a standard radius of curvature, k represents a conic constant, and An represents an n-th order aspherical coefficient. "e-x" means "$\times 10^{-x}$". Note that, the lens surfaces having the aspherical surfaces are marked with asterisks (*) on the left side of surface numbers in the tables.

Correspondences between the embodiments and the conditional expressions described above are shown in Table 1.

[Numerical Embodiment 1]
Unit: mm

Surface data

| Surface number | r | d | nd | vd |
|---|---|---|---|---|
| 1 | 1743.686 | 2.30 | 1.80518 | 25.4 |
| 2 | 119.347 | 7.96 | | |
| 3 | 263.319 | 9.04 | 1.43875 | 94.9 |
| 4 | −162.329 | 2.71 | | |
| 5 | 101.291 | 11.34 | 1.49700 | 81.5 |
| 6 | −338.240 | 0.15 | | |
| 7 | 64.826 | 9.02 | 1.67790 | 55.3 |
| 8 | 204.030 | (Variable) | | |
| 9* | −406.075 | 1.00 | 1.88300 | 40.8 |
| 10 | 19.654 | 5.85 | | |
| 11 | −45.298 | 6.44 | 1.92286 | 18.9 |
| 12 | −19.256 | 0.75 | 1.88300 | 40.8 |
| 13 | 89.228 | 0.15 | | |
| 14 | 37.437 | 2.55 | 1.64769 | 33.8 |
| 15 | 37.727 | (Variable) | | |
| 16* | 83.656 | 3.73 | 1.98913 | 61.2 |
| 17 | −83.657 | 0.50 | | |
| 18 | 130.870 | 1.00 | 1.92286 | 18.9 |
| 19 | 58.222 | 3.36 | 1.61800 | 63.3 |
| 20 | −657.226 | (Variable) | | |
| 21 | −202.631 | 1.00 | 1.71736 | 29.5 |
| 22 | 75.692 | 2.52 | 1.49700 | 81.5 |
| 23 | 336.229 | 0.15 | | |
| 24 | 39.371 | 6.55 | 1.58913 | 61.2 |
| 25* | −38.748 | (Variable) | | |
| 26 (Stop) | ∞ | 1.75 | | |
| 27 | −61.629 | 0.85 | 1.88300 | 40.8 |
| 28 | 18.449 | 2.73 | 1.92286 | 18.9 |
| 29 | 49.691 | 2.22 | | |
| 30 | −38.516 | 0.75 | 2.00330 | 28.3 |
| 31 | 53.399 | 5.00 | | |
| 32 | 136.196 | 2.00 | 1.77250 | 49.6 |
| 33 | 65.448 | 7.59 | 1.84666 | 23.8 |
| 34 | −37.044 | 30.00 | | |
| 35 | 144.615 | 5.75 | 1.48749 | 70.2 |
| 36 | −34.309 | 0.15 | | |
| 37 | 51.683 | 0.75 | 1.88300 | 40.8 |
| 38 | 61.033 | 6.00 | 1.48749 | 70.2 |
| 39 | −41.594 | 0.15 | | |
| 40 | 832.309 | 6.40 | 1.48749 | 70.2 |
| 41 | −24.289 | 1.00 | 1.84666 | 23.6 |
| 42 | −45.486 | 0.15 | | |
| 43 | 73.188 | 4.37 | 1.48749 | 70.2 |
| 44 | −95.214 | 5.00 | | |
| 45 | ∞ | 33.00 | 1.60859 | 46.4 |
| 46 | ∞ | 13.20 | 1.51633 | 64.1 |
| 47 | ∞ | (BF) | | |
| Image plane | ∞ | | | |

Aspherical surface data

Ninth surface

K = 5.65759e+002    A4 = −3.57232e−006    A6 = −1.49046e−007    A8 = 4.33693e−010
A10 = −2.39638e−012    A12 = 3.92301e−015
A3 = 3.94540e−006    A5 = 1.66910e−006    A7 = −2.94816e−010    A9 = 2.05685e−011
A11 = −2.88728e−014

Sixteenth surface

K = −3.18697e+000    A4 = 1.23895e−006    A6 = 4.06078e−008    A8 = −5.79909e−011
A10 = 4.73095e−013    A12 = −1.26330e−015
A3 = −5.80241e−006    A5 = −6.14215e−007    A7 = 9.66731e−010    A9 = −1.26924e−011
A11 = 2.92074e−014

Twenty-fifth surface

K = 3.16758e+000    A4 = 1.70902e−005    A6 = 3.35395e−008    A8 = −1.93411e−010

-continued

[Numerical Embodiment 1]
Unit: mm

A10 = −1.27506e−012  A12 = −4.53241e−016
A3 = −2.26019e−006   A5 = −3.17120e−007   A7 = 1.29210e−009   A9 = 1.56416e−011
A11 = 5.79331e−014

Various data
Zoom ratio 22.50

|  | Wide angle | Intermediate | Telephoto |
|---|---|---|---|
| Focal length | 8.00 | 120.00 | 180.00 |
| F number | 1.88 | 1.87 | 2.57 |
| Half angle of field | 34.51 | 2.62 | 1.75 |
| Image height | 5.50 | 5.50 | 5.50 |
| Total lens length | 300.90 | 300.90 | 300.90 |
| BF | 9.15 | 9.15 | 9.15 |
| d8 | 1.20 | 50.54 | 53.17 |
| d15 | 80.32 | 14.33 | 1.57 |
| d20 | 1.80 | 11.10 | 23.46 |
| d25 | 1.55 | 8.80 | 6.67 |
| d47 | 9.15 | 9.15 | 9.15 |

Zoom lens unit data

| Unit | Leading surface | Focal length |
|---|---|---|
| 1 | 1 | 76.50 |
| 2 | 9 | −14.60 |
| 3 | 16 | 60.00 |
| 4 | 21 | 45.00 |
| 5 | 26 | 25.41 |

[Numerical Embodiment 2]
Unit: mm

Surface data

| Surface number | r | d | nd | vd |
|---|---|---|---|---|
| 1 | 203.928 | 5.35 | 1.77250 | 49.6 |
| 2 | 94.646 | 47.37 | | |
| 3 | −244.273 | 4.40 | 1.43875 | 94.9 |
| 4 | −637.636 | 1.89 | | |
| 5 | 155.644 | 8.50 | 1.72825 | 28.5 |
| 6 | 199.304 | 12.18 | | |
| 7 | 454.267 | 4.30 | 1.84666 | 23.8 |
| 8 | 214.831 | 3.46 | | |
| 9 | 249.356 | 25.62 | 1.43875 | 94.9 |
| 10 | −184.918 | 4.96 | | |
| 11 | 187.253 | 21.86 | 1.43875 | 94.9 |
| 12 | −232.754 | 0.15 | | |
| 13 | 146.632 | 6.12 | 1.67790 | 55.3 |
| 14 | 186.264 | (Variable) | | |
| 15* | 379.462 | 2.50 | 1.91082 | 35.3 |
| 16 | 52.655 | 8.18 | | |
| 17 | 718.163 | 9.07 | 1.92286 | 18.9 |
| 18 | −49.736 | 1.50 | 1.75500 | 52.3 |
| 19 | 360.445 | 5.28 | | |
| 20 | −56.672 | 1.50 | 1.83481 | 42.7 |
| 21 | 723.220 | (Variable) | | |
| 22 | 82.838 | 8.98 | 1.59349 | 67.0 |
| 23* | −80.863 | 0.03 | | |
| 24 | −162.986 | 4.04 | 1.49700 | 81.5 |
| 25 | −78.921 | 0.40 | | |
| 26 | −94.877 | 1.90 | 1.84666 | 23.8 |
| 27 | −535.175 | 5.52 | 1.49700 | 81.5 |
| 28 | −76.659 | (Variable) | | |
| 29 | −2604.548 | 2.00 | 1.84666 | 23.8 |
| 30 | 116.774 | 5.43 | 1.49700 | 81.5 |
| 31 | −159.207 | 0.15 | | |
| 32 | 56.883 | 7.83 | 1.59349 | 67.0 |
| 33* | −175.114 | (Variable) | | |
| 34 (Stop) | ∞ | 2.67 | | |
| 35 | −54.767 | 1.50 | 1.81600 | 46.6 |

[Numerical Embodiment 2]
Unit: mm

| | | | | |
|---|---|---|---|---|
| 36 | 21.055 | 3.47 | 1.95906 | 17.5 |
| 37 | 38.183 | 5.95 | | |
| 38 | −20.946 | 1.50 | 1.77250 | 49.6 |
| 39 | 82.087 | 9.38 | 1.71736 | 29.5 |
| 40 | −24.802 | 2.00 | | |
| 41 | −33.934 | 1.60 | 1.81600 | 46.6 |
| 42 | 61.167 | 10.46 | 1.59551 | 39.2 |
| 43 | −33.356 | 4.49 | | |
| 44 | −274.899 | 6.36 | 1.50137 | 56.4 |
| 45 | −61.588 | 1.00 | | |
| 46 | 145.482 | 2.00 | 1.83300 | 40.8 |
| 47 | 36.013 | 7.76 | 1.49700 | 81.5 |
| 48 | −89.413 | 0.81 | | |
| 49 | 88.100 | 7.21 | 1.49700 | 81.5 |
| 50 | −41.277 | 2.00 | 1.84666 | 23.8 |
| 51 | −140.724 | 0.50 | | |
| 52 | 176.952 | 6.25 | 1.48749 | 70.2 |
| 53 | −42.491 | 10.00 | | |
| 54 | ∞ | 33.00 | 1.60859 | 46.4 |
| 55 | ∞ | 13.20 | 1.51633 | 64.2 |
| 56 | ∞ | (BF) | | |
| Image plane | ∞ | | | |

Aspherical surface data

Fifteenth surface $K = 6.24274e+001$  $A4 = 1.81485e-007$  $A6 = -2.29831e-010$  $A8 = -1.08554e-013$ Twenty-third surface $K = 2.77735e+000$  $A4 = 2.28010e-006$  $A6 = 1.59526e-010$  $A8 = 1.94061e-013$ Thirty-third surface $K = 3.13832e+001$  $A4 = 9.99560e-007$  $A6 = 6.33523e-011$  $A8 = 4.02189e-012$
$A10 = 1.32231e-015$  $A12 = 1.85178e-018$
$A3 = 1.13881e-006$  $A5 = 1.10549e-008$  $A7 = 3.71754e-012$  $A9 = -1.85671e-013$
$A11 = 8.46653e-018$

Various data
Zoom ratio 25.00

| | Wide angle | Intermediate | Telephoto |
|---|---|---|---|
| Focal length | 6.80 | 115.00 | 170.01 |
| F number | 1.60 | 1.60 | 2.20 |
| Half angle of field | 38.97 | 2.74 | 1.85 |
| Image height | 5.50 | 5.50 | 5.50 |
| Total lens length | 552.02 | 552.02 | 552.02 |
| BF | 8.89 | 8.89 | 8.89 |
| d14 | 2.92 | 140.99 | 146.74 |
| d21 | 193.14 | 18.52 | 1.21 |
| d28 | 1.50 | 19.53 | 22.15 |
| d33 | 2.00 | 20.53 | 29.46 |
| d56 | 8.89 | 8.89 | 8.89 |

Zoom lens unit data

| Unit | Leading surface | Focal length |
|---|---|---|
| 1 | 1 | 169.00 |
| 2 | 15 | −31.40 |
| 3 | 22 | 65.80 |
| 4 | 29 | 73.20 |
| 5 | 34 | 28.52 |

[Numerical Embodiment 3]
Unit: mm

Surface data

| Surface number | r | | nd | vd |
|---|---|---|---|---|
| 1 | 501.941 | 5.00 | 1.71736 | 29.5 |

[Numerical Embodiment 3]
Unit: mm

| | | | | |
|---|---|---|---|---|
| 2 | 177.000 | 2.99 | | |
| 3 | 253.973 | 11.70 | 1.43387 | 95.1 |
| 4 | −537.665 | 0.25 | | |
| 5 | 183.448 | 11.16 | 1.43387 | 95.1 |
| 6 | 8397.814 | 0.25 | | |
| 7 | 114.694 | 13.98 | 1.49700 | 81.5 |
| 8 | 913.232 | (Variable) | | |
| 9* | −226.144 | 2.00 | 1.88300 | 40.8 |
| 10 | 23.505 | 6.44 | | |
| 11 | −68.325 | 1.90 | 1.77250 | 49.6 |
| 12 | 88.770 | 0.20 | | |
| 13 | 56.416 | 4.40 | 1.92286 | 18.9 |
| 14 | −161.094 | 0.49 | | |
| 15 | −104.599 | 1.50 | 1.67790 | 55.3 |
| 16 | 255.811 | (Variable) | | |
| 17 | 436.679 | 4.08 | 1.49700 | 81.5 |
| 18 | −110.145 | 0.50 | | |
| 19 | 128.455 | 4.50 | 1.59240 | 68.3 |
| 20 | −379.573 | (Variable) | | |
| 21 | 115.835 | 2.50 | 1.80518 | 25.4 |
| 22 | 36.534 | 8.81 | 1.59349 | 67.0 |
| 23 | −116.787 | 0.20 | | |
| 24 | 42.999 | 6.72 | 1.49700 | 81.5 |
| 25 | −565.298 | (Variable) | | |
| 26 (Stop) | ∞ | 3.28 | | |
| 27 | −40.642 | 1.80 | 1.83481 | 42.7 |
| 28 | 16.527 | 4.83 | 1.84666 | 23.8 |
| 29 | 107.842 | 4.46 | | |
| 30 | −25.545 | 1.60 | 1.81600 | 46.6 |
| 31 | 19.363 | 7.53 | 1.60342 | 38.0 |
| 32 | −18.672 | 2.02 | | |
| 33 | −423.581 | 5.00 | 1.77250 | 49.6 |
| 34 | 39.839 | 10.00 | | |
| 35 | −250.000 | 3.76 | 1.48749 | 70.2 |
| 36 | −36.958 | 0.15 | | |
| 37 | −287.319 | 2.10 | 1.88300 | 40.8 |
| 38 | 51.225 | 9.01 | 1.48749 | 70.2 |
| 39 | −20.044 | 0.15 | | |
| 40 | −121.339 | 6.52 | 1.43749 | 70.2 |
| 41 | −21.336 | 2.10 | 1.88300 | 40.8 |
| 42 | −50.113 | 1.50 | | |
| 43 | 29.806 | 4.95 | 1.48749 | 70.2 |
| 44 | 130.195 | 5.00 | | |
| 45 | ∞ | 33.00 | 1.60859 | 46.4 |
| 46 | ∞ | 13.20 | 1.51633 | 64.2 |
| 47 | ∞ | (BF) | | |
| Image plane | ∞ | | | |

Aspherical surface data

Ninth surface

K = −2.88305e+001   A4 = 1.53637e−006   A6 = 6.61659e−009   A8 = −3.00155e−011
A10 = 3.56108e−014   A12 = −9.53328e−017
A3 = −2.22713e−006   A5 = −9.16217e−008   A7 = 1.84689e−010   A9 = −3.41390e−013
A11 = 2.52181e−015

Various data
Zoom zatio 40.00

| | Wide angle | Intermediate | Telephoto |
|---|---|---|---|
| Focal length | 10.00 | 222.00 | 400.00 |
| F number | 2.00 | 2.00 | 3.60 |
| Half angle of field | 28.81 | 1.42 | 0.79 |
| Image height | 5.50 | 5.50 | 5.50 |
| Total lens length | 391.89 | 391.89 | 391.89 |
| BF | 8.50 | 8.50 | 8.50 |
| d8 | 1.55 | 113.41 | 123.13 |
| d16 | 153.93 | 16.61 | 1.49 |
| d20 | 12.90 | 24.10 | 42.10 |
| d25 | 3.49 | 17.76 | 5.14 |
| d47 | 8.50 | 8.50 | 8.50 |

Zoom lens unit data

-continued

[Numerical Embodiment 3]
Unit: mm

| Unit | Leading surface | Focal length |
|---|---|---|
| 1 | 1 | 165.00 |
| 2 | 9 | −23.39 |
| 3 | 17 | 85.00 |
| 4 | 21 | 54.52 |
| 5 | 26 | 27.67 |

[Numerical Embodiment 4]
Unit: mm

Surface data

| Surface number | r | d | nd | vd |
|---|---|---|---|---|
| 1 | 3755.497 | 2.30 | 1.80518 | 25.4 |
| 2 | 129.326 | 8.30 | | |
| 3 | 194.228 | 10.74 | 1.43875 | 94.9 |
| 4 | −151.705 | 0.15 | | |
| 5 | 105.225 | 9.57 | 1.49700 | 81.5 |
| 6 | −1322.894 | 0.15 | | |
| 7 | 65.987 | 9.36 | 1.67790 | 55.3 |
| 8 | 201.253 | (Variable) | | |
| 9* | −7646.270 | 1.00 | 1.88300 | 40.8 |
| 10 | 19.327 | 6.05 | | |
| 11 | −60.148 | 6.44 | 1.92286 | 18.9 |
| 12 | −20.339 | 0.75 | 1.88300 | 40.8 |
| 13 | 66.649 | 0.15 | | |
| 14 | 33.054 | 2.78 | 1.64769 | 33.8 |
| 15 | 70.461 | (Variable) | | |
| 16* | 102.535 | 3.63 | 1.58913 | 61.2 |
| 17 | −83.580 | 0.50 | | |
| 18 | 152.380 | 1.00 | 1.92286 | 18.9 |
| 19 | 61.491 | 3.49 | 1.61800 | 63.3 |
| 20 | −313.364 | (Variable) | | |
| 21 | −260.970 | 1.00 | 1.71736 | 29.5 |
| 22 | 75.463 | 4.04 | 1.49700 | 81.5 |
| 23 | −336.884 | 0.15 | | |
| 24 | 41.992 | 6.23 | 1.58913 | 61.2 |
| 25* | −44.206 | (Variable) | | |
| 26 (Stop) | ∞ | 1.75 | | |
| 27 | −61.629 | 0.85 | 1.88300 | 40.8 |
| 28 | 18.449 | 2.73 | 1.92286 | 18.9 |
| 29 | 49.691 | 2.22 | | |
| 30 | −38.516 | 0.75 | 2.00330 | 28.3 |
| 31 | 53.399 | 5.00 | | |
| 32 | 136.196 | 2.00 | 1.77250 | 49.6 |
| 33 | 65.448 | 7.59 | 1.84666 | 23.8 |
| 34 | −37.044 | 30.00 | | |
| 35 | 144.615 | 5.75 | 1.48749 | 70.2 |
| 36 | −34.309 | 0.15 | | |
| 37 | −51.683 | 0.75 | 1.88300 | 40.8 |
| 38 | 61.033 | 6.00 | 1.48749 | 70.2 |
| 39 | −41.5394 | 0.15 | | |
| 40 | 832.309 | 6.40 | 1.48749 | 70.2 |
| 41 | −24.289 | 1.00 | 1.84666 | 23.8 |
| 42 | −45.486 | 0.15 | | |
| 43 | 73.188 | 4.37 | 1.48749 | 70.2 |
| 44 | −100.379 | 5.00 | | |
| 45 | ∞ | 33.00 | 1.60859 | 46.4 |
| 46 | ∞ | 13.20 | 1.51633 | 64.1 |
| 47 | ∞ | (BF) | | |
| Image plan | ∞ | | | |

Aspherical surface data

Ninth surface

K = −3.94780e+005   A4 = −9.23917e−006   A6 = −1.50430e−007   A8 = 4.25087e−010
A10 = −2.11129e−012   A12 = 2.88043e−015
A3 = 8.70471e−006   A5 = 2.06679e−006   A7 = −2.09286e−009   A3 = 2.39326e−011
A11 = −2.85360e−014
Sixteenth surface

[Numerical Embodiment 4]
Unit: mm

| | | | |
|---|---|---|---|
| K = −7.01105e+000 | A4 = 1.87359e−006 | A6 = 4.28293e−008 | A8 = −4.93247e−011 |
| A10 = 4.17950e−013 | A12 = −1.18405e−015 | | |
| A3 = −2.85083e−006 | A5 = −6.84424e−007 | A7 = 1.14088e−009 | A9 = −1.37272e−011 |
| A11 = 3.12651e−014 | | | |

Twenty-fifth surface

| | | | |
|---|---|---|---|
| K = 4.37223e+000 | A4 = 1.11707e−005 | A6 = 2.37095e−008 | A3 = −1.72799e−010 |
| A10 = −1.29286e−012 | A12 = −7.59781e−016 | | |
| A3 = 4.70434e−006 | A5 = 3.09135e−008 | A7 = 1.96189e−010 | A9 = 1.91642e−011 |
| A11 = 5.65958e−014 | | | |

Various data
Zoom ratio 22.50

| | Wide angle | Intermediate | Telephoto |
|---|---|---|---|
| Focal length | 8.00 | 120.00 | 180.00 |
| F number | 1.90 | 1.90 | 2.52 |
| Half angle of field | 34.51 | 2.62 | 1.75 |
| Image height | 5.50 | 5.50 | 5.50 |
| Total lens length | 303.96 | 303.96 | 303.96 |
| BF | 9.00 | 9.00 | 9.00 |
| d8 | 1.20 | 52.44 | 54.94 |
| d15 | 84.05 | 15.40 | 1.80 |
| d20 | 1.58 | 11.32 | 23.08 |
| d25 | 1.55 | 9.21 | 8.56 |
| d47 | 9.00 | 9.00 | 9.00 |

Zoom lens unit data

| Unit | Leading surface | Focal length |
|---|---|---|
| 1 | 1 | 80.00 |
| 2 | 9 | −14.80 |
| 3 | 16 | 63.82 |
| 4 | 21 | 43.15 |
| 5 | 26 | 25.92 |

[Numerical Embodiment 5]
Unit: mm

Surface data

| Surface number | r | d | nd | vd |
|---|---|---|---|---|
| 1 | 438.902 | 5.00 | 1.85026 | 32.3 |
| 2 | 188.295 | 9.75 | | |
| 3 | 419.441 | 11.54 | 1.43387 | 95.1 |
| 4 | −372.186 | 0.25 | | |
| 5 | 150.603 | 15.65 | 1.43387 | 95.1 |
| 6 | −947.718 | 0.25 | | |
| 7 | 118.797 | 13.17 | 1.43387 | 95.1 |
| 8 | 666.658 | (Variable) | | |
| 9* | 128.392 | 2.00 | 1.88300 | 40.8 |
| 10 | 40.382 | 6.40 | | |
| 11 | −51.100 | 1.90 | 1.77250 | 49.6 |
| 12 | 69.071 | 0.20 | | |
| 13 | 43.976 | 4.81 | 1.92286 | 18.9 |
| 14 | −155.536 | 1.00 | | |
| 15 | −67.860 | 1.50 | 1.88300 | 40.8 |
| 16 | 55.330 | (Variable) | | |
| 17* | 482.129 | 4.25 | 1.49700 | 81.5 |
| 18 | −99.305 | 0.50 | | |
| 19 | 214.488 | 4.50 | 1.59240 | 68.3 |
| 20 | −193.927 | (Variable) | | |
| 21 | 109.149 | 2.50 | 1.78472 | 25.7 |
| 22 | 38.319 | 0.10 | | |
| 23 | 38.440 | 9.91 | 1.59349 | 67.0 |
| 24 | −99.867 | 0.20 | | |
| 25 | 46.355 | 6.99 | 1.49700 | 81.5 |
| 26 | −274.594 | (Variable) | | |
| 27 (Stop) | ∞ | 3.28 | | |

[Numerical Embodiment 5]
Unit: mm

| | | | | |
|---|---|---|---|---|
| 28 | −37.264 | 1.80 | 1.83481 | 42.7 |
| 29 | 17.003 | 4.54 | 1.84666 | 23.8 |
| 30 | 69.582 | 4.12 | | |
| 31 | −38.002 | 1.60 | 1.81600 | 46.6 |
| 32 | 18.946 | 7.18 | 1.60342 | 38.0 |
| 33 | −19.211 | 1.37 | | |
| 34 | −40.949 | 5.00 | 1.77250 | 49.6 |
| 35 | 111.264 | 10.00 | | |
| 36 | −250.000 | 4.42 | 1.48749 | 70.2 |
| 37 | −34.438 | 0.15 | | |
| 38 | −186.713 | 2.10 | 1.88300 | 40.8 |
| 39 | 72.033 | 8.90 | 1.48749 | 70.2 |
| 40 | −22.138 | 0.15 | | |
| 41 | 372.667 | 5.84 | 1.48749 | 70.2 |
| 42 | −23.911 | 2.10 | 1.88300 | 40.8 |
| 43 | −69.523 | 1.50 | | |
| 44 | 37.372 | 3.69 | 1.48749 | 70.2 |
| 45 | 290.850 | 5.00 | | |
| 46 | ∞ | 33.00 | 1.60859 | 46.4 |
| 47 | ∞ | 13.20 | 1.51633 | 64.2 |
| 48 | ∞ | (BF) | | |
| Image plane | ∞ | | | |

Aspherical surface data

Ninth surface

K = −1.36846e+002  A4 = 9.70027e−006  A6 = −9.78219e−009  A8 = −1.11822e−011
A10 = 4.24971e−015  A12 = 4.76098e−016
A3 = −1.23090e−006  A5 = −1.64157e−007  A7 = −1.39819e−010  A9 = 4.71992e−012
A11 = −1.68297e−014

Seventeenth surface

K = −6.83096e+001  A4 = −5.50159e−007  A6 = −3.96704e−009  A8 = 2.78463e−012
A10 = −5.30527e−015  A12 = −1.86414e−017
A3 = 7.59460e−008  A5 = 2.84625e−008  A7 = 1.88099e−010  A9 = −4.06560e−013
A11 = 9.72218e−016

Various data
Zoom ratio 40.00

| | Wide angle | Intermediate | Telephoto |
|---|---|---|---|
| Focal length | 10.00 | 222.00 | 400.00 |
| F number | 2.00 | 2.00 | 3.60 |
| Half angle of field | 28.81 | 1.42 | 0.79 |
| Image height | 5.50 | 5.50 | 5.50 |
| Total lens length | 398.25 | 398.25 | 398.25 |
| BF | 8.50 | 8.50 | 8.50 |
| d8 | 1.00 | 113.36 | 123.13 |
| d16 | 148.20 | 20.57 | 4.12 |
| d20 | 15.76 | 13.83 | 27.71 |
| d26 | 3.49 | 20.69 | 13.49 |
| d48 | 8.50 | 8.50 | 8.50 |

Zoom lens unit data

| Unit | Leading surface | Focal length |
|---|---|---|
| 1 | 1 | 166.75 |
| 2 | 9 | −20.80 |
| 3 | 17 | 85.00 |
| 4 | 21 | 49.75 |
| 5 | 27 | 28.65 |

TABLE 1

| | | Embodiment | | | | |
|---|---|---|---|---|---|---|
| Item | | 1 | 2 | 3 | 4 | 5 |
| First unit focal length | f1 | 76.50 | 169.00 | 165.00 | 80.00 | 166.75 |
| Second unit focal length | f2 | −14.60 | −31.40 | −23.39 | −14.80 | −20.80 |
| Third unit focal length | f3 | 60.00 | 65.80 | 85.00 | 63.82 | 85.00 |

TABLE 1-continued

| | | | Embodiment | | | | |
|---|---|---|---|---|---|---|---|
| | Item | | 1 | 2 | 3 | 4 | 5 |
| | Fourth unit focal length | f4 | 45.00 | 73.20 | 54.52 | 43.15 | 49.75 |
| | Fifth unit focal length | f5 | 25.41 | 28.52 | 27.67 | 25.92 | 28.65 |
| Wide angle end when focused on infinity | Second unit lateral magnification | β2winf | −0.26 | −0.17 | −0.18 | −0.25 | −0.16 |
| | Third unit lateral magnification | β3winf | −1.21 | −0.37 | −0.78 | −1.28 | −0.89 |
| | Fourth unit lateral magnification | β4winf | 0.27 | 0.50 | 0.30 | 0.24 | 0.27 |
| | Fifth unit lateral magnification | β5winf | 1.23 | 1.26 | 1.42 | 1.27 | 1.55 |
| Telephoto end when focused on infinity | Second unit lateral magnification | β2tinf | −3.41 | −0.87 | −4.68 | −3.05 | −3.05 |
| | Third unit lateral magnification | β3tinf | −3.57 | −7.44 | −1.36 | −7.19 | −7.43 |
| | Fourth unit lateral magnification | β4tinf | 0.18 | 0.12 | 0.27 | 0.08 | 0.07 |
| | Fifth unit lateral magnification | β5tinf | 1.23 | 1.26 | 1.42 | 1.27 | 1.55 |
| Wide angle end when focused on proximity | Second unit lateral magnification | β2wmod | −0.23 | −0.14 | −0.17 | −0.22 | −0.15 |
| | Third unit lateral magnification | β3wmod | −1.22 | −0.37 | −0.78 | −1.30 | −0.89 |
| | Fourth unit lateral magnification | β4wmod | 0.27 | 0.50 | 0.30 | 0.24 | 0.27 |
| | Fifth unit lateral magnification | β5wmod | 1.23 | 1.26 | 1.42 | 1.27 | 1.55 |
| Telephoto end when focused on proximity | Second unit lateral magnification | β2tmod | −1.21 | −0.36 | −1.61 | −1.10 | −1.21 |
| | Third unit lateral magnification | β3tmod | 1.30 | 9.17 | 8.89 | 3.19 | 3.16 |
| | Fourth unit lateral magnification | β4tmod | −0.32 | −0.15 | −0.08 | −0.39 | −0.33 |
| | Fifth unit lateral magnification | β5tmod | 1.23 | 1.26 | 1.42 | 1.27 | 1.55 |
| Zoom portion movement amount | Second unit movement amount due to zooming | m2 | 51.97 | 143.82 | 121.59 | 53.74 | 122.13 |
| | Third unit movement amount due to zooming | m3 | −26.78 | −48.11 | −30.85 | −28.51 | −21.96 |
| | Fourth unit movement amount due to zooming | m4 | −5.12 | −27.46 | −1.65 | −7.01 | −10.00 |
| Other specifications | Wide angle end focal length | fw | 8.00 | 6.80 | 10.00 | 8.00 | 10.00 |
| | Telephoto end focal length | ft | 180.00 | 170.01 | 400.00 | 180.00 | 400.00 |
| | Telephoto end focus moving unit driving amount | Δfocus | −21.43 | −26.18 | −19.12 | −20.49 | −19.74 |
| | Zoom ratio when focused on infinity | Zinf | 22.50 | 25.00 | 40.00 | 22.50 | 40.00 |
| | Zoom ratio when focused on proximity | Zmod | 20.80 | 19.93 | 30.21 | 20.00 | 34.87 |
| | Conditional Expression (1) | | 0.35 | 0.33 | 0.15 | 0.55 | 0.67 |
| | Conditional Expression (2) | | 1.47 | 1.56 | 1.87 | 1.59 | 2.39 |
| | Conditional Expression (3) | | 1.33 | 8.90 | 1.56 | 1.48 | 1.71 |
| | Conditional Expression (4) | | 2.35 | 1.01 | 2.42 | 2.25 | 2.40 |
| | Conditional Expression (5) | | −5.24 | −5.38 | −7.05 | −5.41 | −8.02 |
| | Conditional Expression (6) | | 1.28 | 2.57 | 1.94 | 1.26 | 1.86 |
| | Conditional Expression (7) | | 1.70 | 2.31 | 3.03 | 1.85 | 3.55 |
| | Conditional Expression (8) | | 3.01 | 5.93 | 5.96 | 3.09 | 5.82 |
| | Conditional Expression (9) | | 0.89 | 0.80 | 0.76 | 0.89 | 0.87 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-236641, filed Oct. 26, 2012, which is hereby incorporated by reference herein in its entirety.

What is claimed is:

1. A zoom lens, comprising, in order from an object side:
a first lens unit that does not move;
a second lens unit having a negative refractive power, which moves during zooming;
a third lens unit having a positive refractive power, which moves during zooming;
a fourth lens unit having a positive refractive power, which moves during zooming and focus adjustment;
an aperture stop that does not move in an optical axis direction; and
a fifth lens unit having a positive refractive power, which does not move, wherein:
the following expressions are satisfied:

$0.10 < LN(\beta 3_{tinf}/\beta 3_{winf})/LN(Z_{inf}) < 0.95;$ $0.6 < (1-\beta 4_{tinf}^2) \times \beta 5_{tinf}^2 < 2.5;$ and $0.6 < f3/f4 < 2.0,$ where $Z_{inf}$ represents a zooming ratio of an entire system when focused on infinity, $\beta 3_{winf}$ represents a lateral magnification of the third lens unit at the wide angle end when focused on infinity, $\beta 3_{tinf}$ represents a lateral magnification of the third lens unit at a telephoto end when focused on infinity, $\beta 4_{tinf}$ represents a lateral magnification of the fourth lens unit at the telephoto end when focused on infinity, $\beta 5_{tinf}$ represents a lateral magnification of the fifth lens unit at the telephoto end when focused on infinity, f3 represents a focal length of the third lens unit, and f4 represents a focal length of the fourth lens unit.

2. A zoom lens according to claim 1, wherein the following expression is satisfied:

$$-10.0<f1/f2<-4.0,$$

where f1 represents a focal length of the first lens unit, and f2 represents a focal length of the second lens unit.

3. A zoom lens according to claim 1, wherein the following expression is satisfied:

$$1.0<f1/f4<4.0,$$

where f1 represents a focal length of the first lens unit.

4. A zoom lens according to claim 1, wherein the following expression is satisfied:

$$1.0<f1/f3<3.5,$$

where f1 represents a focal length of the first lens unit.

5. A zoom lens according to claim 1, wherein the following expression is satisfied:

$$0.8<ft/f1<4.0,$$

where f1 represents a focal length of the first lens unit, and ft represents a focal length of the entire system at the telephoto end when focused on infinity.

6. A zoom lens according to claim 1, wherein the following expression is satisfied:

$$2.5<f1/f5<8.0,$$

where f1 represents a focal length of the first lens unit, and f5 represents a focal length of the fifth lens unit.

7. An image pickup apparatus, comprising:
a zoom lens including, in order from an object side:
   a first lens unit that does not move;
   a second lens unit having a negative refractive power, which moves during zooming;
   a third lens unit having a positive refractive power, which moves during zooming;
   a fourth lens unit having a positive refractive power, which moves during zooming and focus adjustment;
   an aperture stop that does not move in an optical axis direction; and
   a fifth lens unit having a positive refractive power, which does not move, wherein:
   the following expressions are satisfied:

$$0.10<LN(\beta 3_{tinf}/\beta 3_{winf})/LN(Z_{inf})<0.95;$$

$$0.6<(1-\beta 4_{tinf}^2)\times \beta 5_{tinf}^2<2.5; \text{ and}$$

$$0.6<f3/f4<2.0,$$

where $Z_{inf}$ represents a zooming ratio of an entire system when focused on infinity, $\beta 3_{winf}$ represents a lateral magnification of the third lens unit at the wide angle end when focused on infinity, $\beta 3_{tinf}$ represents a lateral magnification of the third lens unit at a telephoto end when focused on infinity, $\beta 4_{tinf}$ represents a lateral magnification of the fourth lens unit at the telephoto end when focused on infinity, $\beta 5_{tinf}$ represents a lateral magnification of the fifth lens unit at the telephoto end when focused on infinity, f3 represents a focal length of the third lens unit, and f4 represents a focal length of the fourth lens unit; and
a solid-state image pickup element for receiving an image formed by the zoom lens.

* * * * *